(12) United States Patent
Wiser et al.

(10) Patent No.: US 7,263,497 B1
(45) Date of Patent: Aug. 28, 2007

(54) SECURE ONLINE MUSIC DISTRIBUTION SYSTEM

(75) Inventors: Philip R. Wiser, Redwood City, CA (US); Andrew R. Cherenson, Los Altos, CA (US); Steven T. Ansell, Fremont, CA (US); Susan A. Cannon, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/289,513

(22) Filed: Apr. 9, 1999

Related U.S. Application Data

(63) Continuation-in-part of application No. 09/020,025, filed on Feb. 6, 1998.

(51) Int. Cl.
*G06Q 30/00* (2006.01)
(52) U.S. Cl. .......................................... 705/26; 705/71
(58) Field of Classification Search .................... 705/1, 705/26, 27, 64, 71
See application file for complete search history.

(56) References Cited

U.S. PATENT DOCUMENTS

| | | | |
|---|---|---|---|
| 5,191,573 A | 3/1993 | Hair | 369/84 |
| 5,418,713 A | 5/1995 | Allen | 364/403 |
| 5,621,796 A | 4/1997 | Davis et al. | 380/24 |
| 5,623,547 A | 4/1997 | Jones et al. | 380/24 |
| 5,636,276 A | 6/1997 | Brugger | 380/4 |
| 5,673,316 A | 9/1997 | Auerbach et al. | 380/4 |
| 5,675,734 A | 10/1997 | Hair | 395/200.01 |
| 5,715,314 A | 2/1998 | Payne et al. | 380/24 |

(Continued)

FOREIGN PATENT DOCUMENTS

EP 0715243 A1 5/1996

(Continued)

OTHER PUBLICATIONS

Schneier and Kelsey, "Cryptographic Support for Secure Logs on Untrusted Machines," *The Seventh USENIX Security Symposium Proceedings*, USENIX Press, Jan. 1998, pp. 53-62.

(Continued)

*Primary Examiner*—C. Luke Gilligan
(74) *Attorney, Agent, or Firm*—Woodcock Washburn LLP

(57) ABSTRACT

A secure music distribution system securely distributes digital products such as music, video, and/or computer software along with related media over a public telecommunications network, such as the Internet, employing a client-server architecture. The digital products are stored and controlled by a content manager computer system and are sold by separate merchant computer systems. The secure music distribution system includes a music distribution center which operates with any number of client systems and with any number of merchant systems. The music distribution center includes a content manager and at least one delivery server. The content manager maintains a media information database, a master media file system, and a transaction database. In addition, the music distribution center interfaces with a media licensing center, which in turn communicates with one or more distributed rights agent servers and the merchant servers. The merchant server executes in a merchant computer system, which also includes an HTTP (HyperText Transfer Protocol) server. The merchant servers interface with various payment processing systems. The client systems include a media player and a Web browser. Additional delivery servers and media licensing centers operate independently and externally to the music distribution center and interface with the music distribution center.

8 Claims, 24 Drawing Sheets

U.S. PATENT DOCUMENTS

| | | | | |
|---|---|---|---|---|
| 5,724,424 | A | 3/1998 | Gifford | 380/24 |
| 5,734,823 | A | 3/1998 | Saigh et al. | 395/200.06 |
| 5,734,891 | A | 3/1998 | Saigh | 395/610 |
| 5,742,845 | A | 4/1998 | Wagner | 395/831 |
| 5,790,677 | A | 8/1998 | Fox et al. | 380/24 |
| 5,794,217 | A | 8/1998 | Allen | 705/27 |
| 5,809,144 | A | 9/1998 | Sirbu et al. | 380/25 |
| 5,889,860 | A | 3/1999 | Eller et al. | 380/4 |
| 5,900,564 | A | 5/1999 | Kurakake | 84/477 R |
| 6,182,052 | B1 * | 1/2001 | Fulton et al. | 705/26 |

FOREIGN PATENT DOCUMENTS

| | | |
|---|---|---|
| EP | 0 791 901 A2 | 8/1997 |
| EP | 0843449 A2 | 5/1998 |
| FR | 2733068 | 4/1995 |

OTHER PUBLICATIONS

Digital River, "Marketing Software on the Internet: A White Paper," Printed from website http://www.digitalriver.com/.

Digital River, "Technology Solutions to Electronic Transactions: A White Paper," Printed from website http://www.digitalriver.com/.

Digital River, "Fraud Prevention Technology," Printed from website http://www.digitalriver.com/.

One-page printed papers from website http://www.digitalriver.com/ on Digital River's "Mission," "Technology," "Security," "Privacy," and "How It Works".

* cited by examiner

Figure 1A:
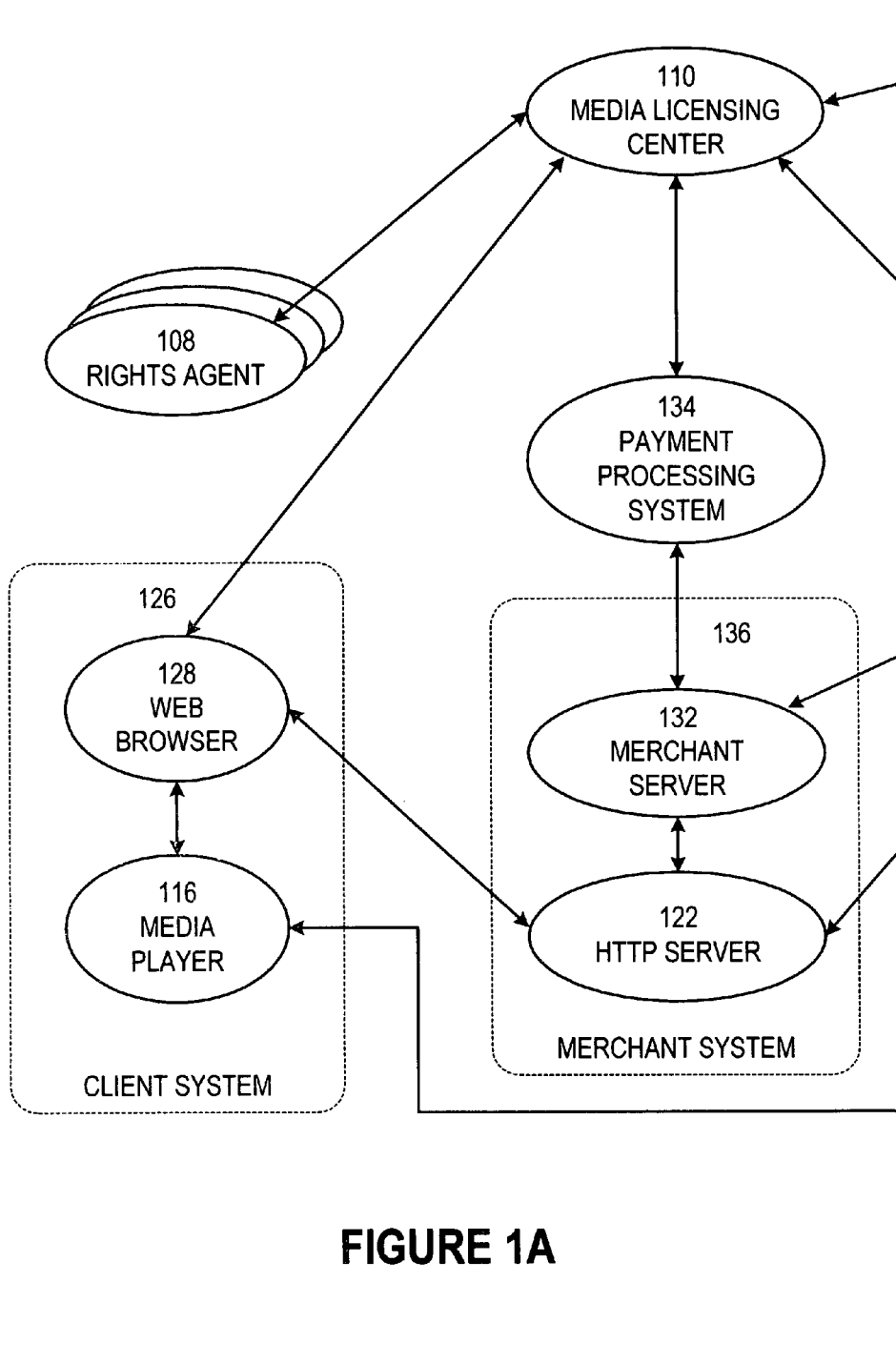

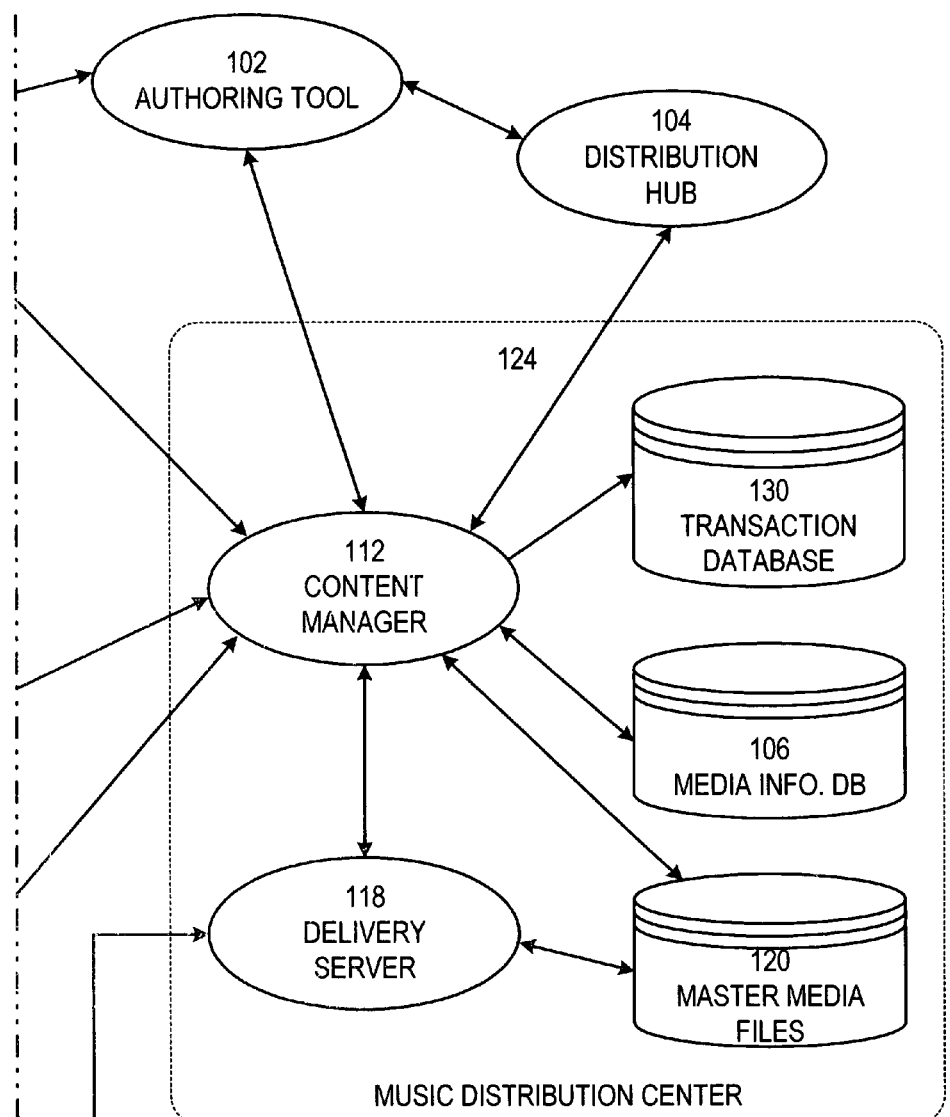
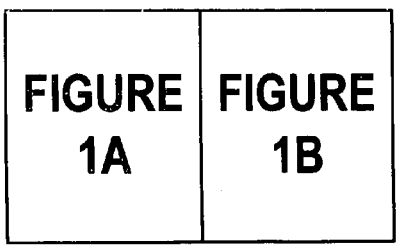
FIGURE 1B
FIGURE 1

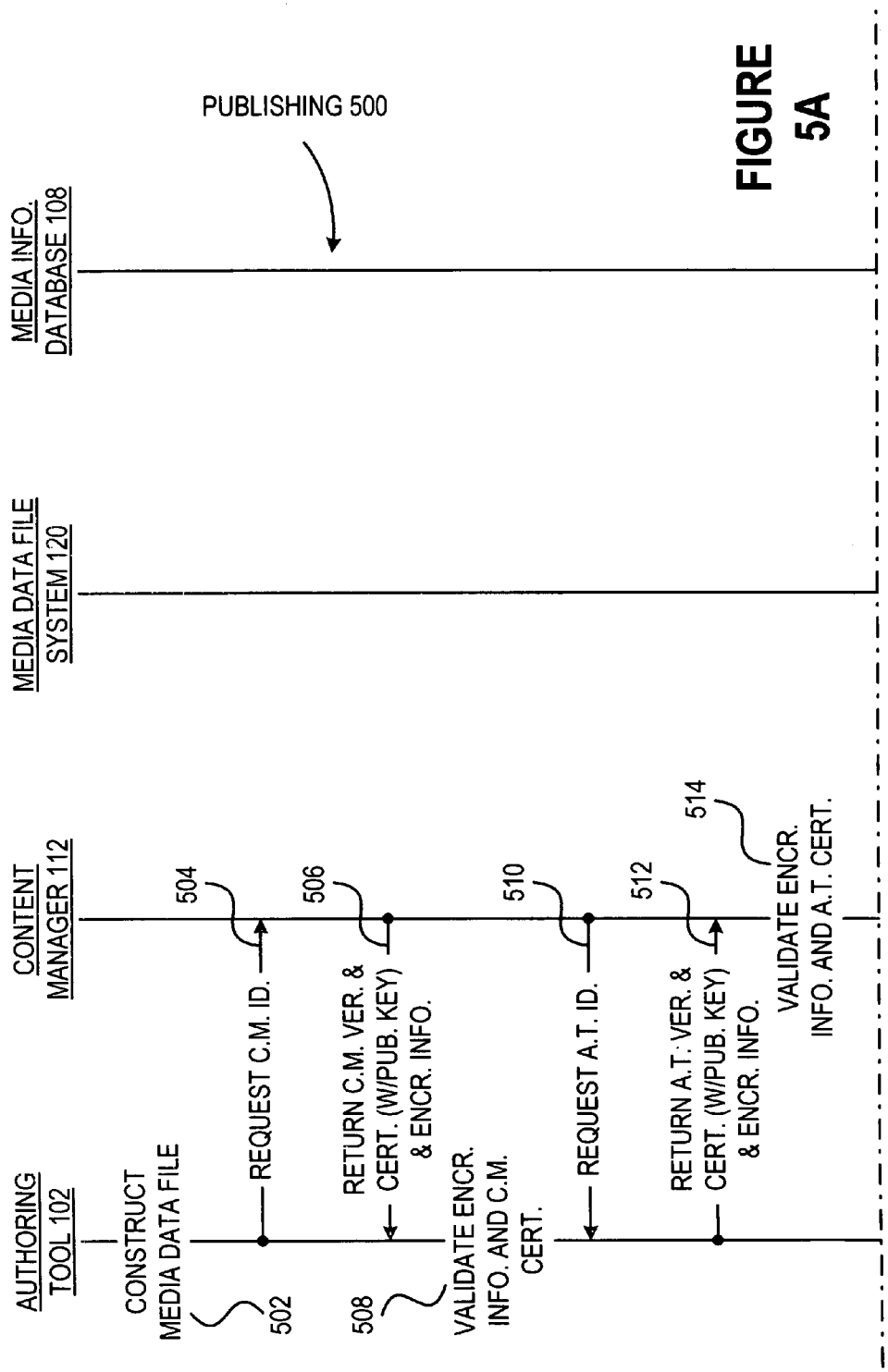

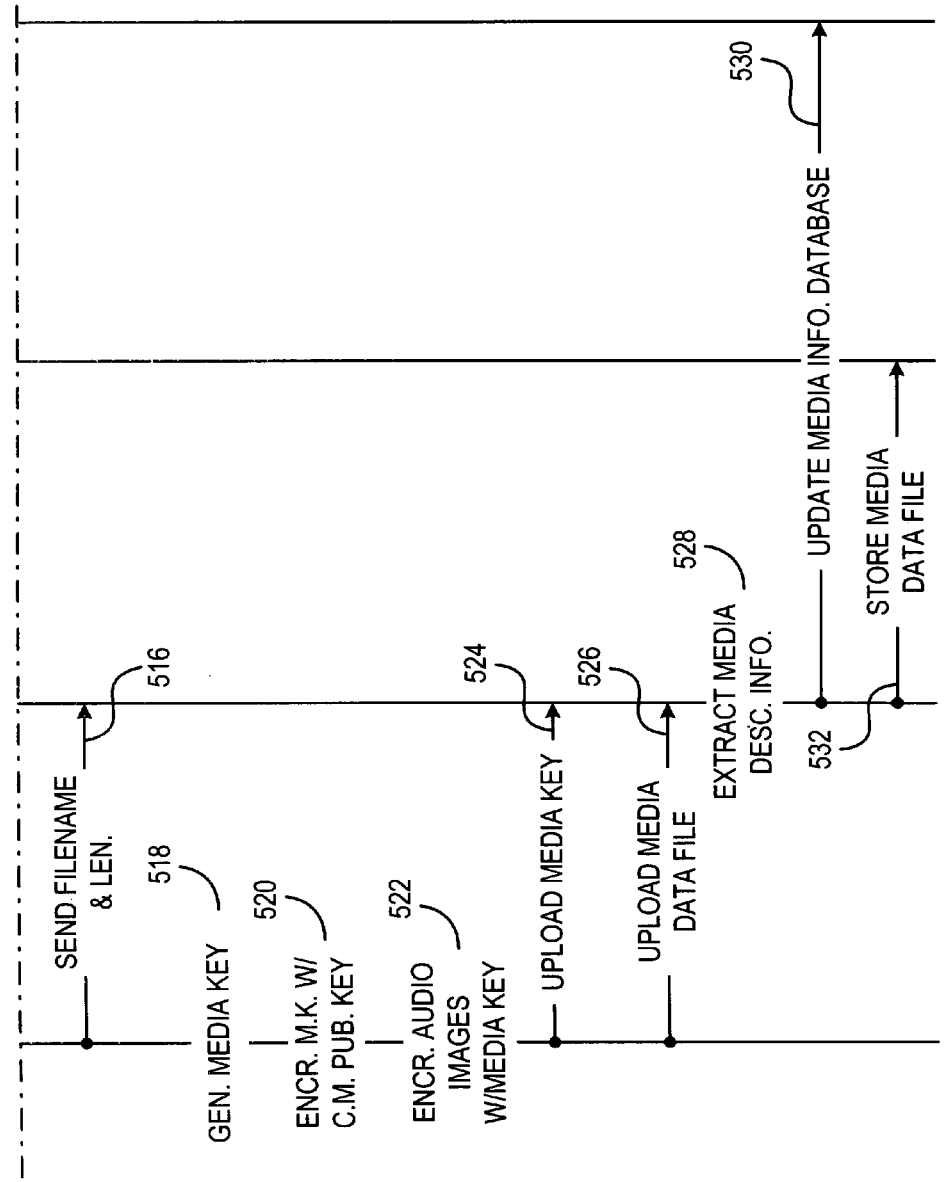

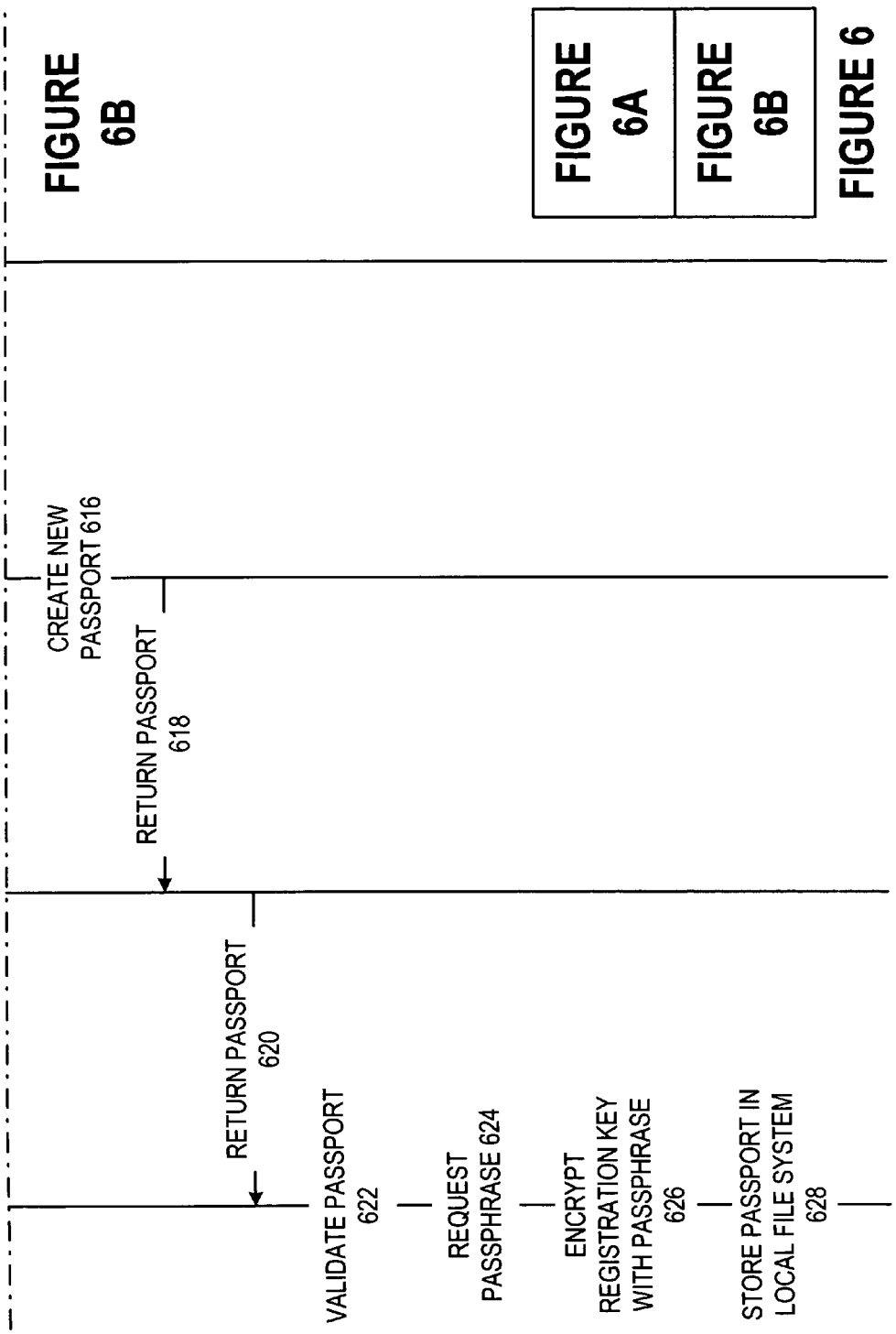

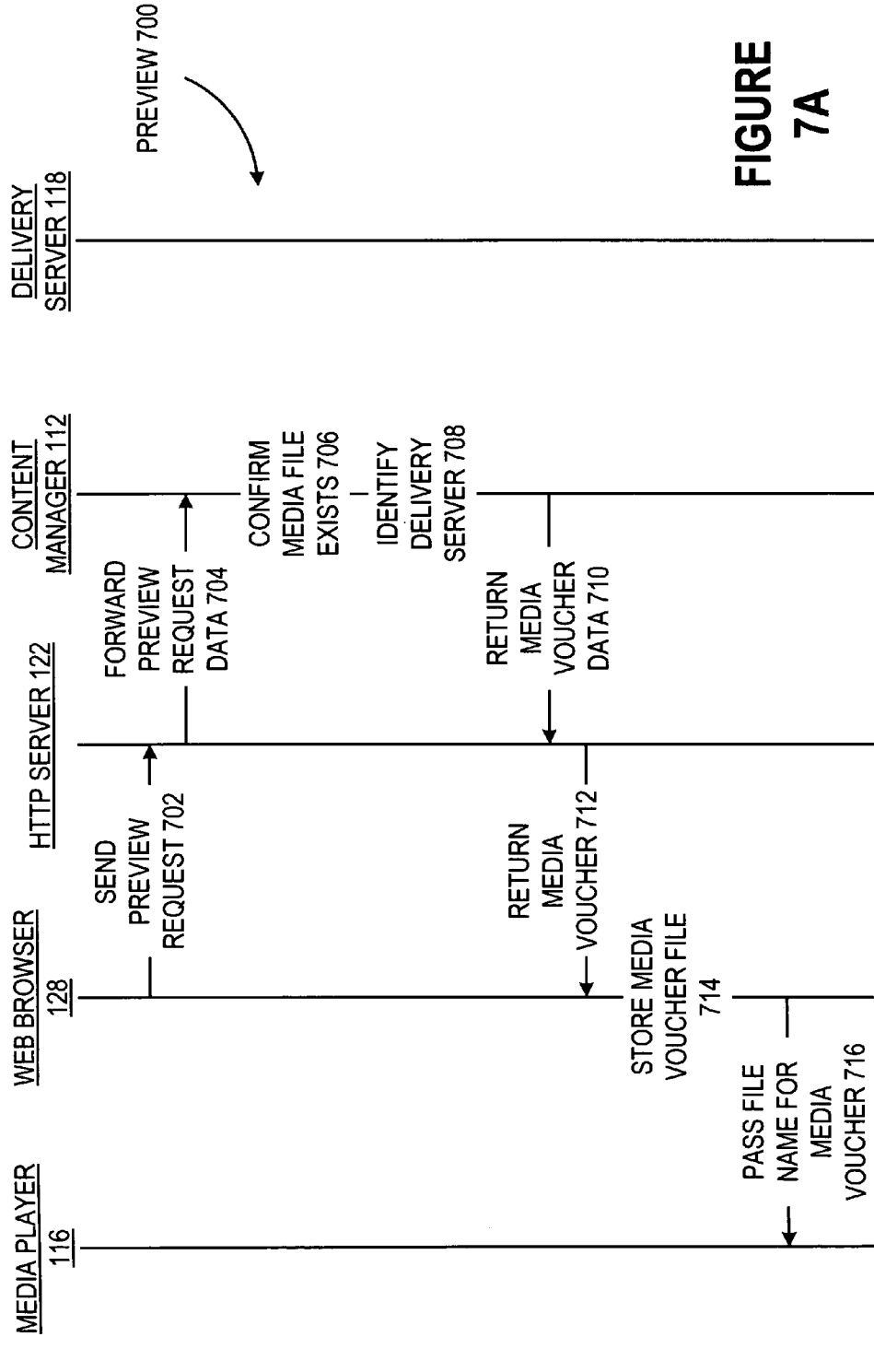

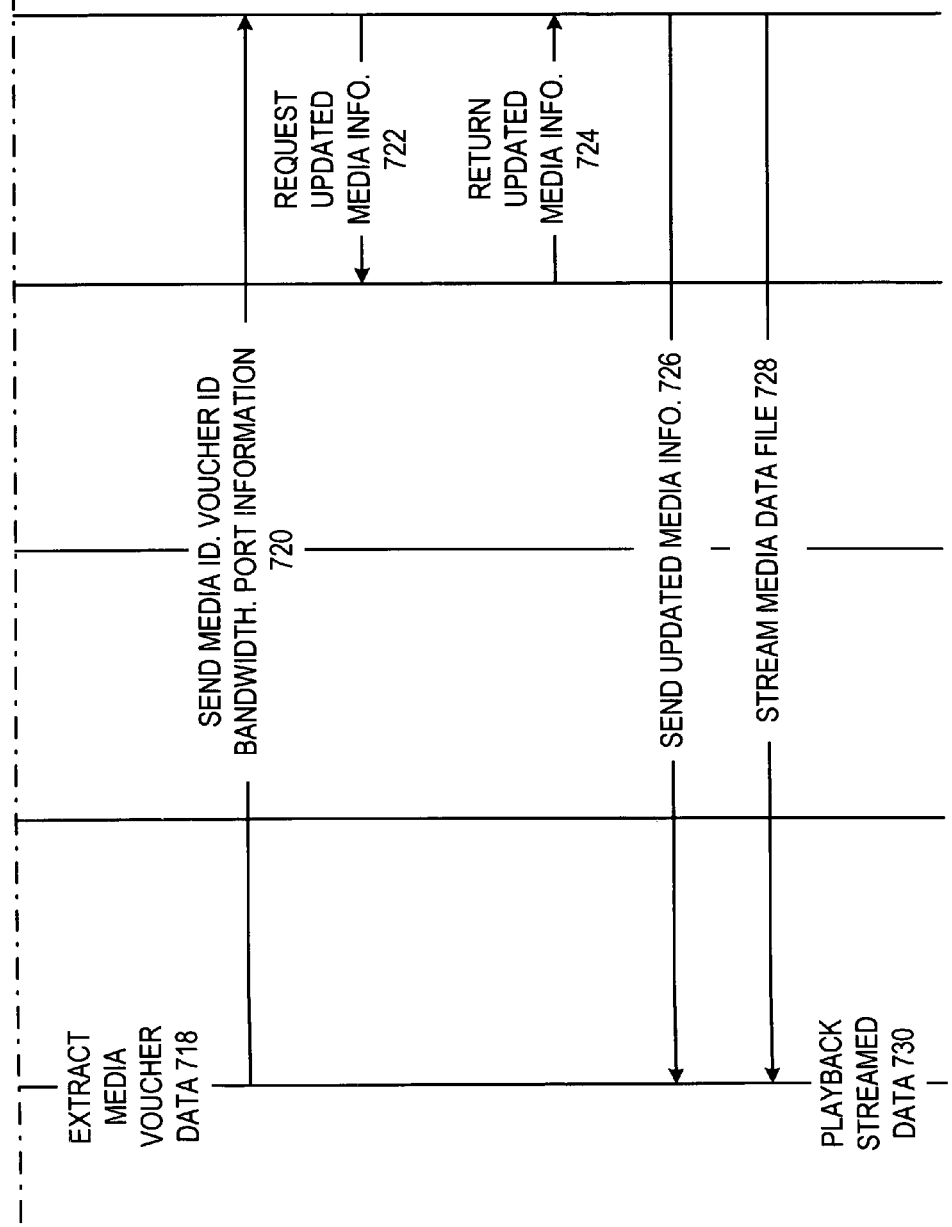

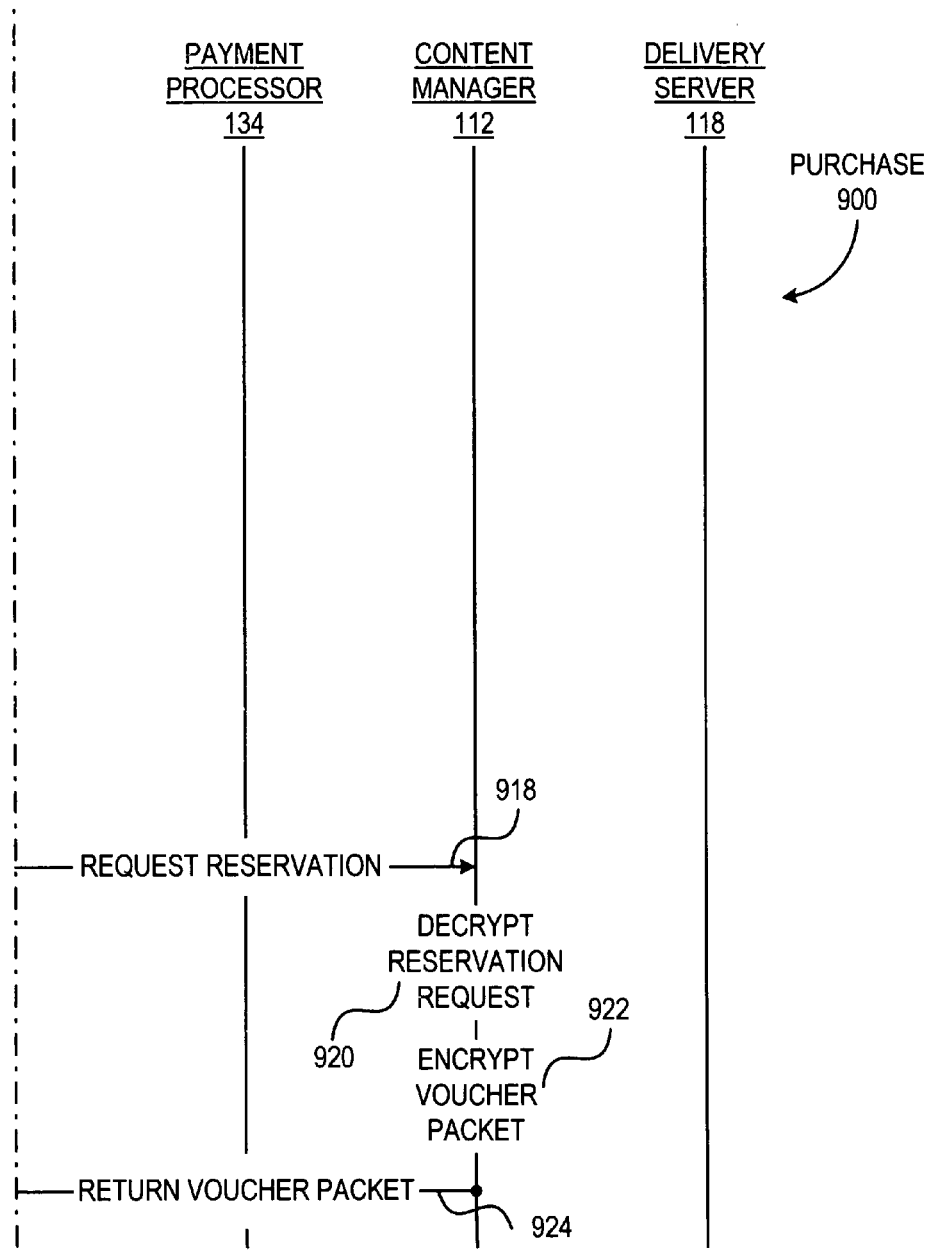

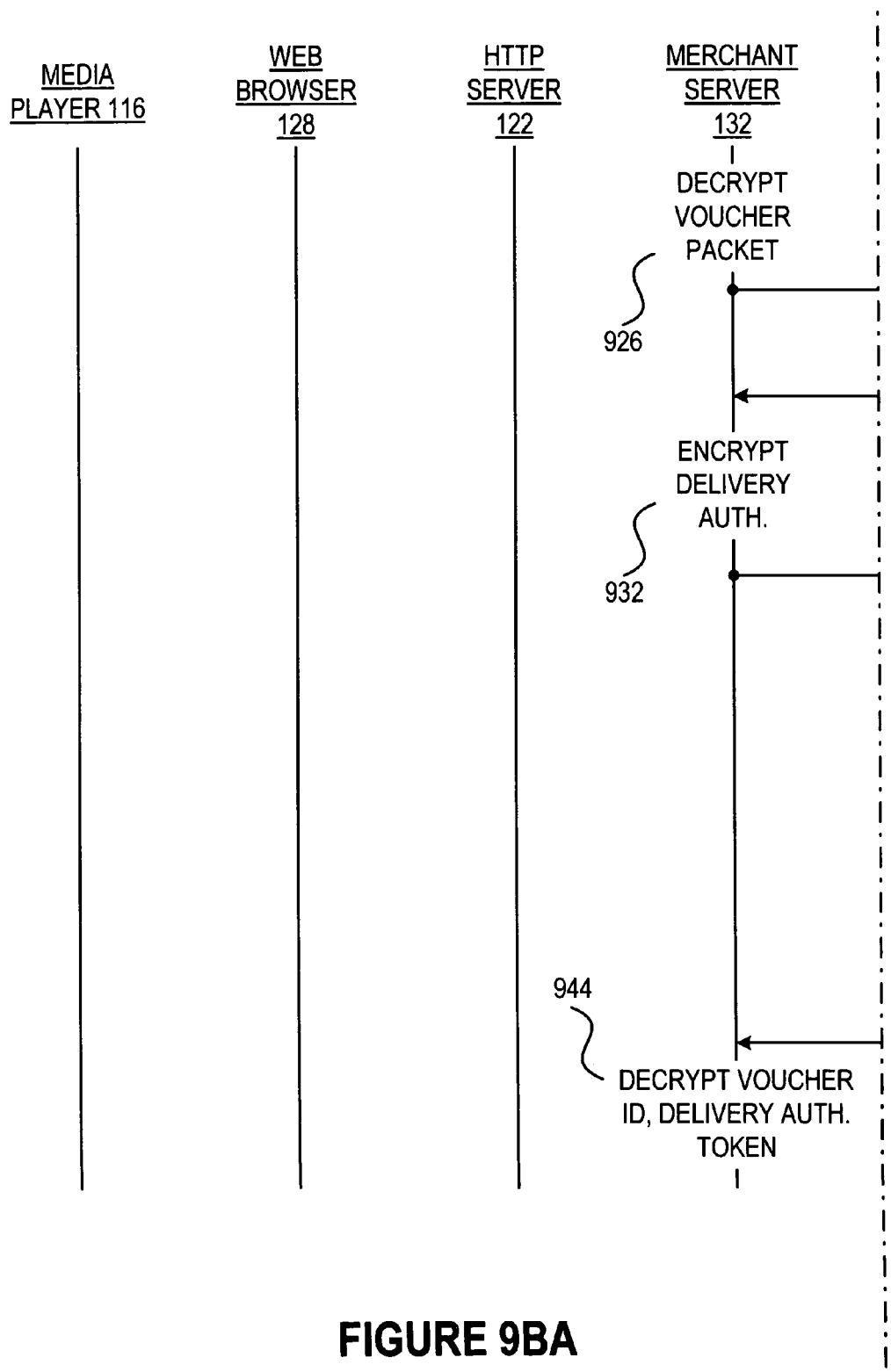

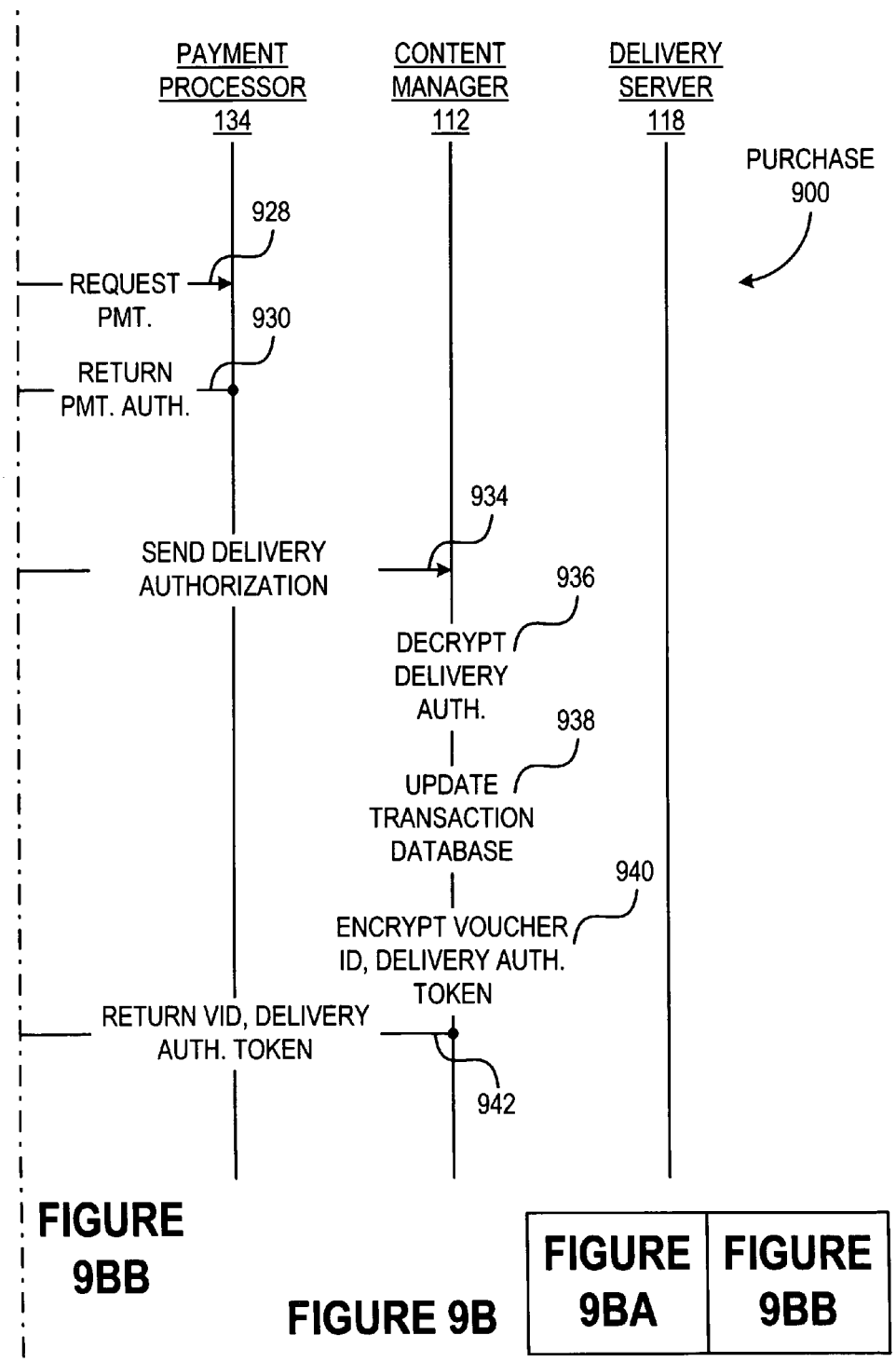

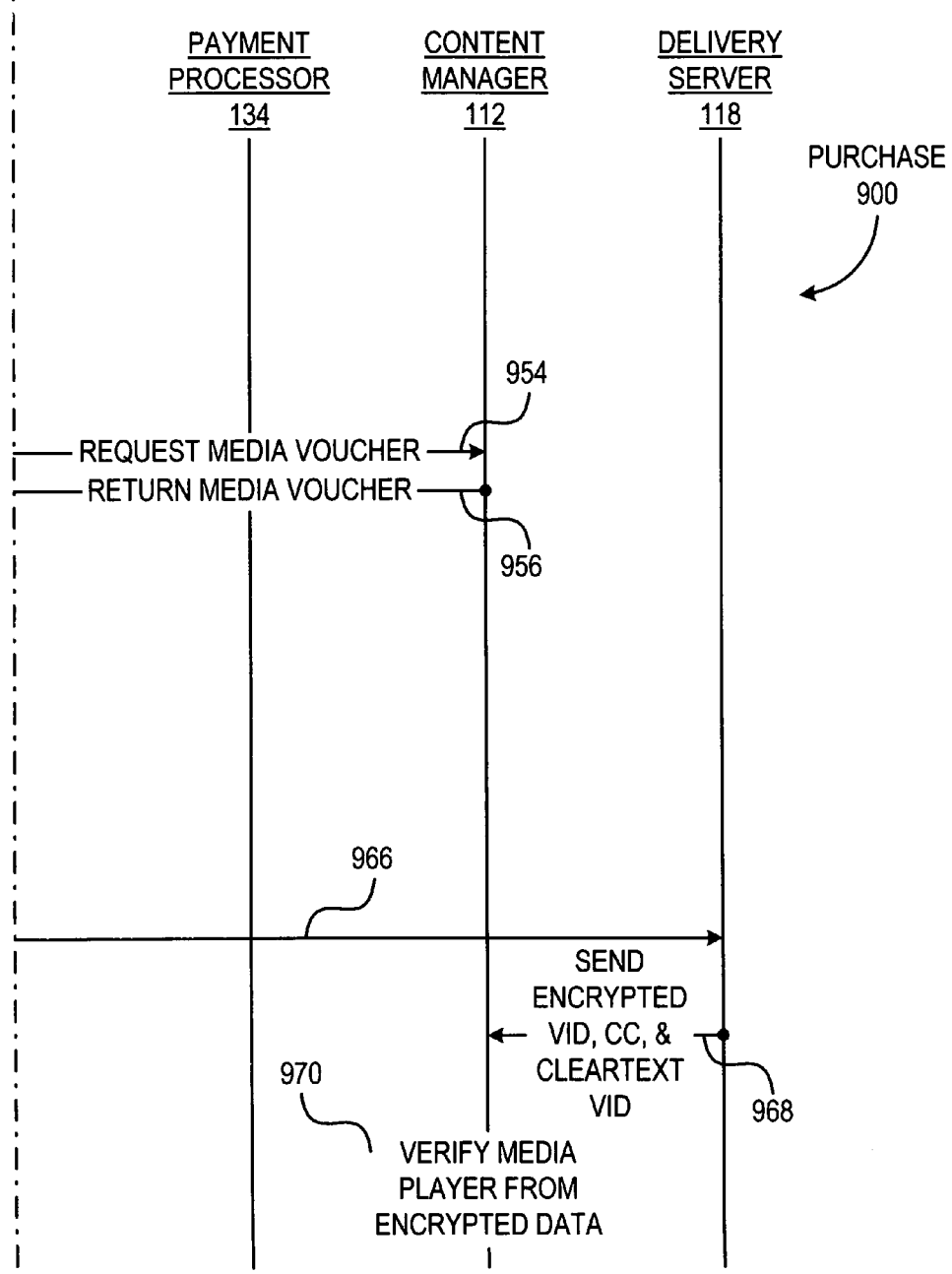

SECURE ONLINE MUSIC DISTRIBUTION SYSTEM

This is a continuation-in-part of U.S. patent application Ser. No. 09/020,025 filed Feb. 6, 1998.

FIELD OF THE INVENTION

This invention relates generally to the field of commerce through a wide area computer network, and more particularly, to distribution of digital media data over publicly accessible wide area computer networks.

BACKGROUND OF THE INVENTION

Wide area computer networks such as the Internet have grown tremendously in recent years, both in terms of data traffic and popularity. As a result, such wide area networks have grown in popularity as distribution media for digital products. From a commercial perspective, "distribution" includes the two distinct phases of purchase and delivery. Many vendors currently using wide area computer networks for commercial distribution only support the purchase phase online. As used herein, "online" means through a computer network. Typically, current online vendors provide a catalog which is available online and which lists and/or describes products. Customers review the products by browsing the catalog, using a World Wide Web browser for example, and make the purchase by providing payment information, e.g., credit card information. The purchased merchandise is then delivered to the customer off-line, i.e., through distribution channels other than the computer network such as through the mail. Overwhelmingly, the majority of products purchased in this manner are traditional non-digital products, such as books, clothing, and food products. Even digital products, such as computer software, digitized video, and digitized audio is purchased in this manner, with product selection and purchase being made online but the delivery being made conventionally by mailing the digital products to the purchaser on a conventional medium such as floppy diskette, CD-ROM, video cassette, audio tape or audio CD.

In contrast to conventional online purchase-off-line distribution systems, a complete system for the online distribution of digital products, such as digital audio, would provide online support for both the purchase and delivery phases. Such an online distribution system presents a number of special challenges not associated with non-digital products. For example, unauthorized duplication of digital products is of particular concern. With conventional distribution of music on CD and cassette tapes, losses from copyright infringement from illegal copying of music are estimated at about $1 billion worldwide, annually. The susceptibility of digital audio to unauthorized copying, and the ability to create perfect duplicates, raises the specter of even more significant losses to the music industry, and has been the single greatest factor in the music industry's reluctance to make music available for purchase over the Internet. Thus, an online music purchase and distribution system must be demonstratively secure from a large variety of attacks and misuses in order to preserve the music owner's intellectual property rights.

A number of security risks are present in the online distribution of music. First, there is a considerable security risk in simply maintaining digital media products in computer systems connected to public networks such as the Internet for access by consumers. In order to effectively enable purchasers to review and purchase digital products, the products must generally be stored on a computer that is accessible through a computer network. However, given the commercial value of such digital products, whether audio data, video data, or software, such computers would be likely targets of attempted unauthorized access to the digital products. Further, the very presence of an online commerce system is itself an inducement to crackers to attempt to break the security controls of such a system and gain access thereto. Thus, an online distribution system for digital products must be secure from such direct attacks. Further, if the online music distribution system is compromised, it is desirable that the underlying digital product itself be secure against unauthorized copying.

Similarly, the protocols and transmission mechanisms by which an online distribution system delivers digital products to a legitimate purchaser must also be secure, to prevent unauthorized users from intercepting deliveries of the digital products during transit through the network.

Finally, once the digital product has been delivered to a user, the product itself should be secure from unauthorized duplication by the user or by others.

The need for security in such an online distribution system are in conflict with many of the features consumers want in terms of flexibility and ease of use. In particular regard to the purchase of audio data, such as songs and related media (e.g., lyrics, graphics, liner notes which can typically accompany conventional retail forms of audio media), consumers want to be able to sample audio products prior to purchasing. It is desirable for such an online music distribution system to provide some mechanism by which users can play limited portions of songs and view related media without having to purchase the song. In addition, a consumer should be able to pass on preview music to other potential new customers.

Similarly, purchasers of music in traditional forms such as compact disc or cassettes are accustomed to simple, easy to use consumer devices, such as portable compact disc players and cassette tape players. For the successful distribution of music over the Internet, the security requirements must not unduly interfere with consumers' ease of use of the system. A consumer should be able to purchase and playback audio media easily and securely. However, security measures, particularly encryption mechanisms, should make the purchased audio unusable outside of the specific devices and mechanism designed to cooperate with the distribution system.

Similarly, consumers are accustomed to being able to play purchased music anywhere they can carry a CD and CD player. Consumers will expect similar portability when purchasing digital media over the Internet. Accordingly, a desirable online music distribution system should allow a consumer to playback purchased audio not merely on a single computer, but on any platform equipped with an appropriately licensed playback device and the licensee's personal identification.

Additionally, given the very high audio fidelity available today with conventional CD products, audio purchased over the Internet from an online music distribution system must have at least the same level of fidelity, or otherwise consumers will not purchase such products. Thus, any encryption or compression methods used must not induce significant signal loss, or impair playback performance.

Various forms of online payment processing systems are currently available and in use, including credit card and debit card authorization systems. In addition, many new forms of online payment are currently in development and will be developed in the future, including digital cash and micropayments. Accordingly, an online distribution system should not require a single form of payment, or use a proprietary payment processing system. Rather, a desirable online distribution system should be adaptable to integrate with all forms of payment processors. Similarly, many merchants are now providing their own online commerce servers from which they offer and distribute products as the retail vendor of such products. A desirable online distribution system should integrate with any variety of merchant systems.

An online music distribution system should also allow for the recovery of secured digital products by consumers who have lost the identification or other security information (such as an encryption key) required to use their purchases. In addition, independent agencies which police copyright infringements should also be able to recover infringing copies, and identify the creator of such infringements.

SUMMARY OF THE INVENTION

In accordance with the present invention, a secure online music distribution system provides consumers with flexibility and ease of use in the selection, previewing, downloading, and transporting of audio and other digital products over a wide area computer network such as the Internet. The secure online music distribution system further provides for security of the digital products in all phases of a purchase and delivery transaction throughout the distribution system.

An online music distribution system in accordance with the present invention includes a variety of cooperative components that communicate over a public wide area computer network such as the Internet. These components include a content manager, one or more delivery servers, a media data file system, and a media information database. Internet communications by the system are facilitated by HTTP servers. Any number of individual purchasers use client computer systems with World Wide Web browsers and media players. World Wide Web browsers are known and are sometimes referred to herein simply as "Web browsers."

Further in accordance with the present invention, a payment portion of the purchase transaction is handled by a merchant computer system which receives and processes purchase requests while storage of an inventory of digital products and delivery of such digital products is performed by a remote distribution center computer system. Separation of the merchant computer system from the remote distribution center computer system allows sales of digital products to be offered by Web-based merchants offering other non-digital products which are delivered conventionally, e.g., through conventional shipping of physical products. In addition, greater flexibility is provided in physical or topological placement of such merchant computer systems and such distribution center computer systems. For example, a central merchant computer system can process purchase requests and payment while the requested digital products are delivered online from a physically or topologically closest one of a number of distribution center computer systems. Alternatively, various merchant computer systems operated independently can offer the same digital products from the same distribution center computer system, perhaps even at different, competing prices.

Secure distribution of digital products is provided by three aspects of the online distribution system in accordance with the present invention. First, unlike conventional digital product delivery systems, the online distribution system supports both phases of distribution online: the commercial phase of a purchase transaction, such as authentication of the purchaser and payment, and the delivery of the purchased media itself. This aspect of the online music distribution system is provided by having the content manager control the storage of the digital products in the media data file system, and manage the commercial aspects of a purchase or preview transaction with the purchaser. On the other hand, the actual delivery of the digital products is managed by one of the delivery servers.

Given the security needs of limiting copying, preventing attempts of unauthorized access while digital products are stored on a server or while digital products are in transit through the network, the online distribution system provides secure protocols for consummating the purchase transaction, and for delivering the audio and other media. First, the media player of the user and the user's identity is authenticated by the content manager. Second, the specific media being purchased is encrypted with information uniquely identifying the purchaser (and distinct from mere encryption keys), and known only to the media player of the purchaser. In this manner, only the purchaser's media player can decrypt and playback the purchased audio. Third, the specific purchase transaction is itself represented by a secure and trusted object which is passed between the content manager, media player, and delivery server. Fourth, once the digital product is delivered to the media player by the delivery server, the digital product can only be accessed in the presence of various decryption keys and confidential personal information of the purchaser.

In another aspect of the online distribution system according to the present invention, encrypted and un-encrypted versions of a portion of a digital product, e.g., a song of a digital audio product, are combined into a single media data file along with descriptive text, artwork, and other information. The encrypted version of the song is a high fidelity audio image that is to be purchased. The un-encrypted versions of a song are either selected portions, or the entire song, but recorded with lesser quality, such as increased compression and/or lower sample rate. These un-encrypted, lower quality 'clips' are available free for previewing by the consumer in order to decide whether to purchase the high fidelity version. In addition, descriptive information, such as cover art, lyrics, and credits, is also available for previewing.

In another aspect of the online distribution system according to the present invention, a complete security protocol protects the purchase-quality audio images through various stages of development and playback, from creation by an artist all the way through purchase and playback by the user. The purchase-quality audio data is encrypted when created by the artist with a media key, a cryptographically strong random number generated by an audio authoring tool. This media key is then encrypted with a public key of the content manager. A cryptographically strong random number is a random number of sufficient length, or, equivalently, chosen from a sufficiently large number of possible values, that determination of the random number by guessing or deduction is very difficult. The encrypted high-quality version of the song is combined with the lower-quality un-encrypted versions, descriptive information and the media key into the media data file. The media data file is uploaded to the content manager for storage in the media data file system and is made available for purchase by consumers. While in storage in the online music distribution system, the audio images remain encrypted and tied to the specific content manager.

To purchase a media data file, a consumer first registers with the media licensing center to obtain a digital passport. The passport is a combination of data that includes personal information uniquely identifying a user, information confidential to that user, and encryption key information used to encrypt media data for that person's use. The identifying information is typically the user's name, address, and so forth. The confidential information is preferably some information that the user would prefer to hold confidential, such as a credit card number of the user's. This information is combined in the Passport with a public-private key pair generated by the media licensing center, into a digital certificate authenticating their identity. The private key information is then separately encrypted with symmetric keys, including a user-selected passphrase, and a cryptographically strong random key.

The passport supports security during various phases of the purchase of media data files. First, the certificate is used to authenticate the purchaser to the content manager and delivery server.

Second, the purchaser's public key from the passport is used by the content manager to encrypt the media key for the media data file being purchased. In this manner, only the purchaser's media player can decrypt the media key for the purchased audio and playback the music. When the media player receives a media data file for playback, the media player uses the private key stored in the passport to decrypt the media key included in the media data file. The media key is then used to decrypt the audio image for playback at the user's machine.

Third, the passport's inclusion of confidential information (such as the user's credit card number) is further designed to deter the purchaser from simply giving copies of their passport and purchased audio to another person. During playback, the media player displays the confidential information of the user on the computer display. The display of the confidential information provides a powerful incentive for the purchaser to protect the confidentiality of their passport, and hence indirectly protect the purchased media itself.

The integrity of the purchase and delivery phases of a transaction are secured by a protocol between the content manager, delivery server, the user's Web browser, and media player that uses the purchaser's passport, and a separate trusted data object called a media voucher. The media voucher uniquely identifies the media being purchased, the specific purchase transaction, and the specific delivery server to deliver the purchased media to the media player. The specific purchase transaction is represented by a voucher ID generated by the content manager. The media voucher is provided by the content manager to the user's Web browser once the user's credit card has been checked and payment authorized. The content manager also provides a receipt token, a cryptographically strong random number the media player will use to complete the transaction with the specified delivery server. This completes the purchase phase of the transaction.

The delivery phase of the transaction then takes place between the media player and the delivery server, with validation of the transaction provided by the content manager. The media player creates a message authentication code of the receipt and voucher ID from the media voucher and the consumer's certificate from the passport. This step binds the specific transaction to the purchase. These data are transmitted to the delivery server. The delivery server validates the message authentication data, using the voucher ID and a certificate chain from the packet and the receipt obtained from the content manager. This step validates the identity of the media player to the delivery server. The content manager encrypts the media key of purchased audio images with the purchaser's public key. The delivery server can then deliver the audio to the purchaser's media player. In this way only the purchaser can decrypt the purchased audio.

BRIEF DESCRIPTIONS OF THE DRAWINGS

Figure 2:
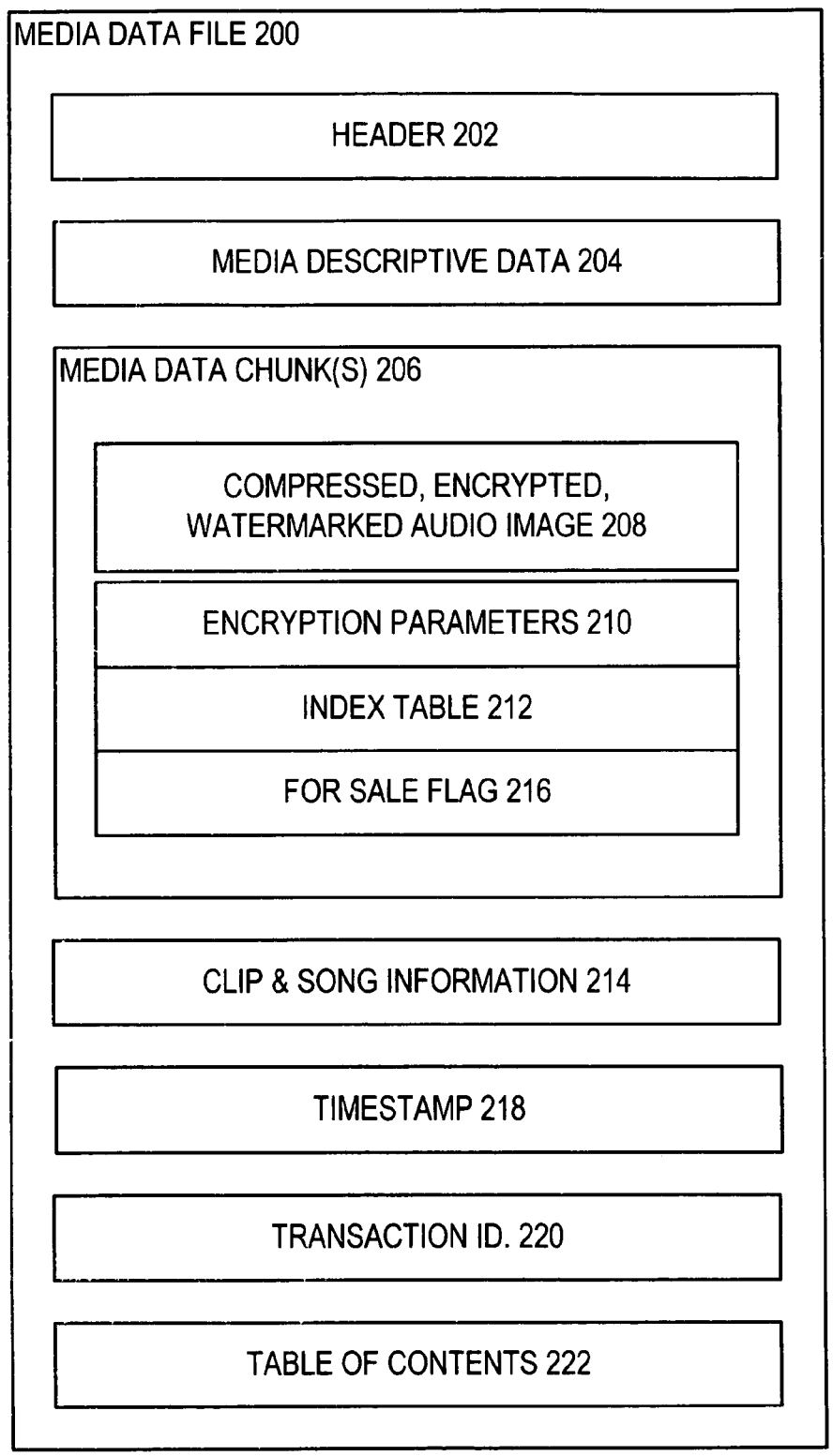
Figure 3:
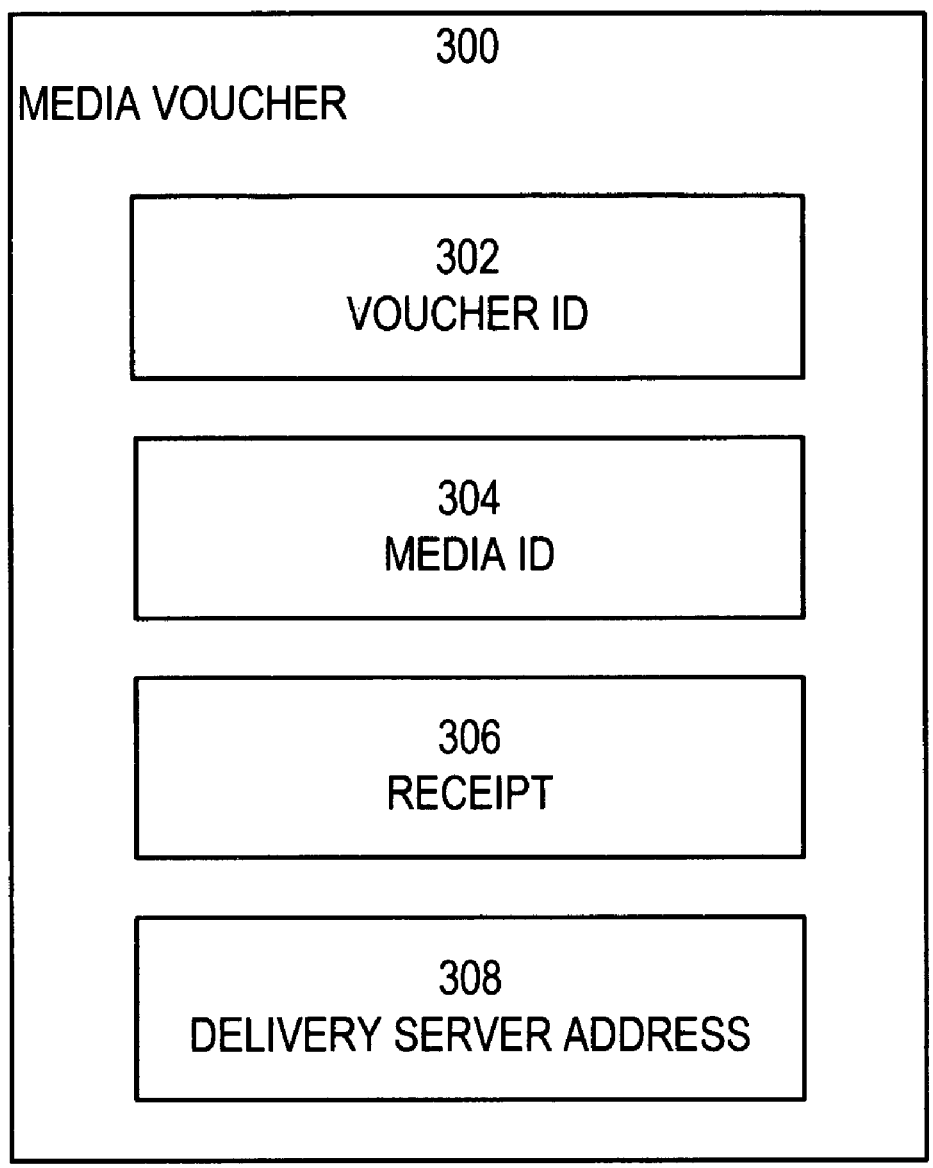
Figure 4:
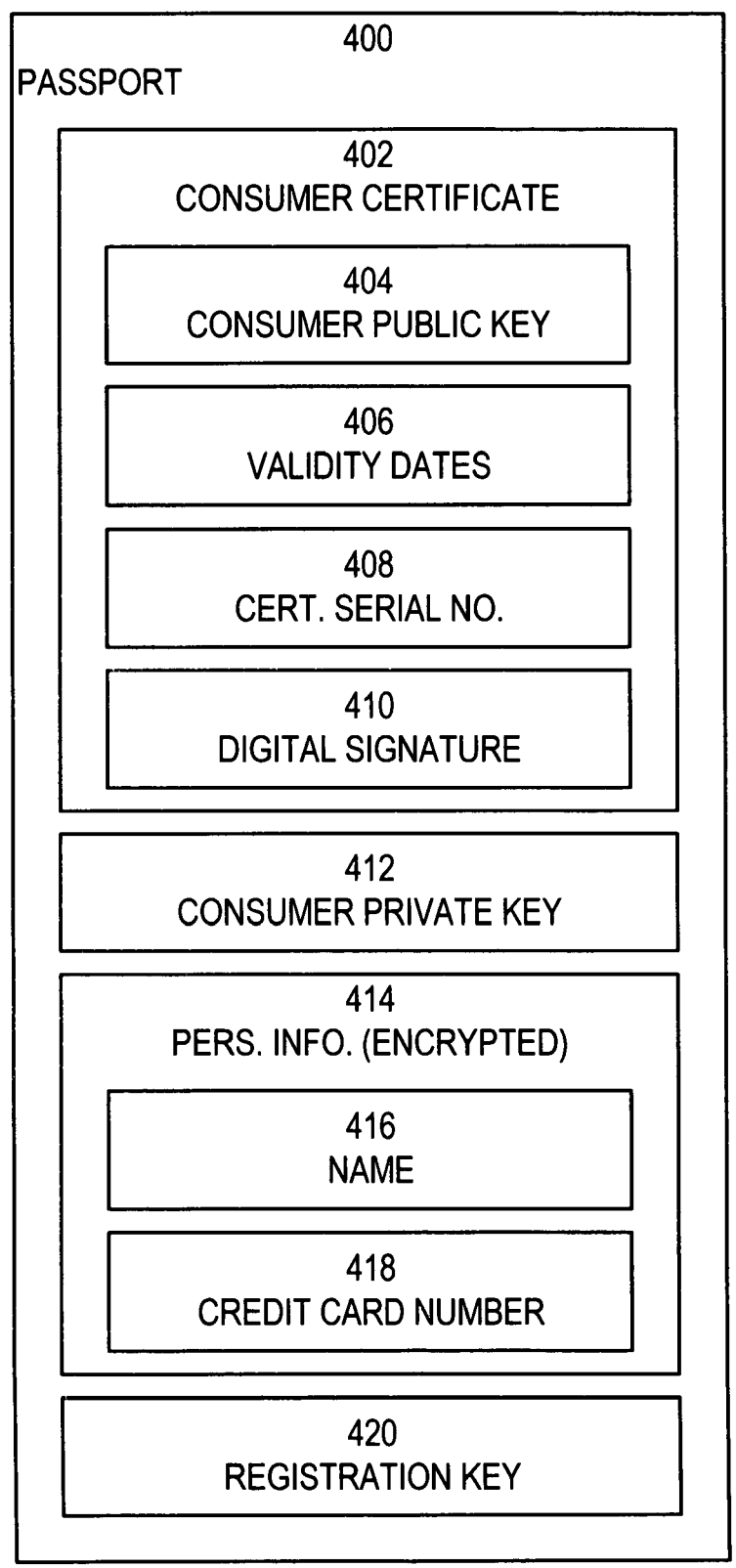
Figure 6A:
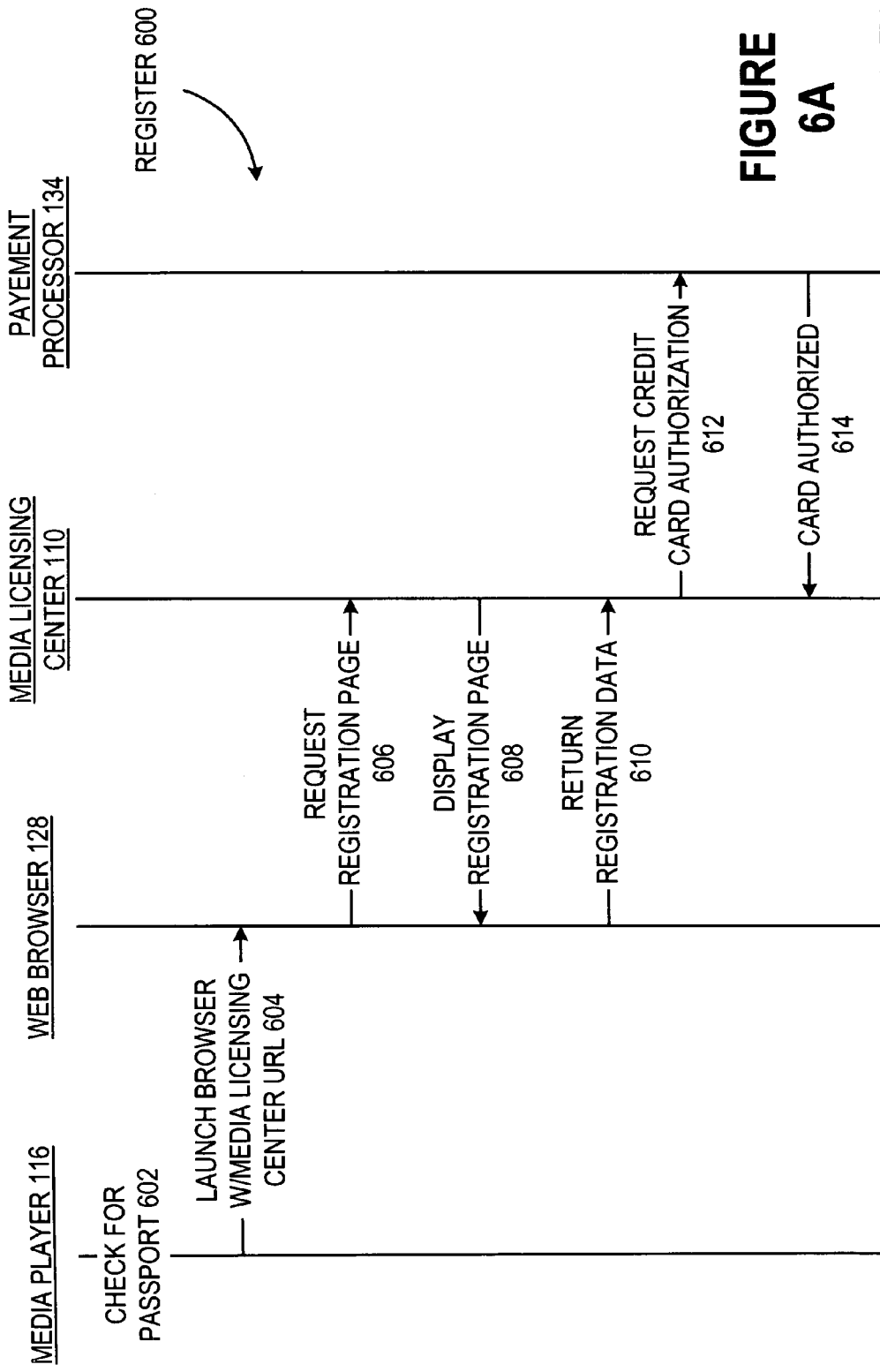
Figure 7:
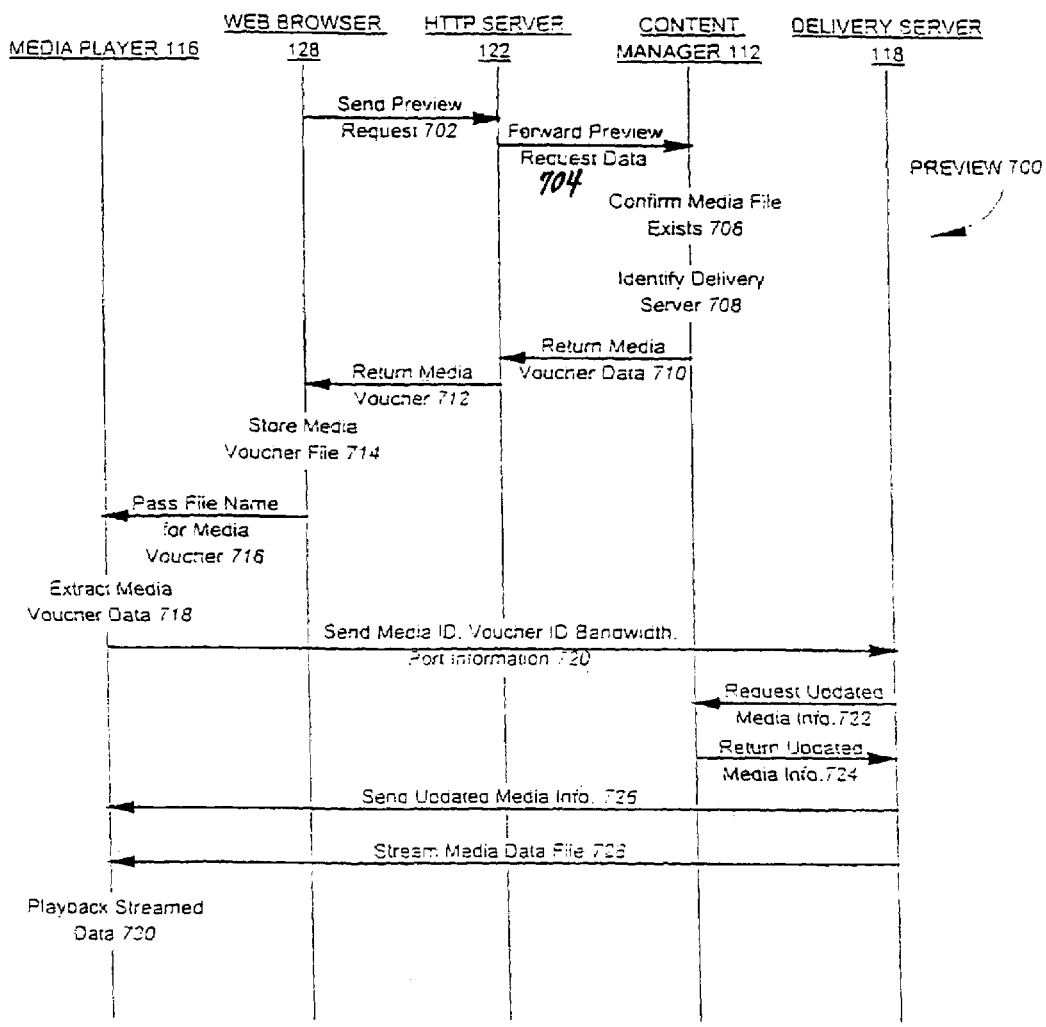
Figure 8:
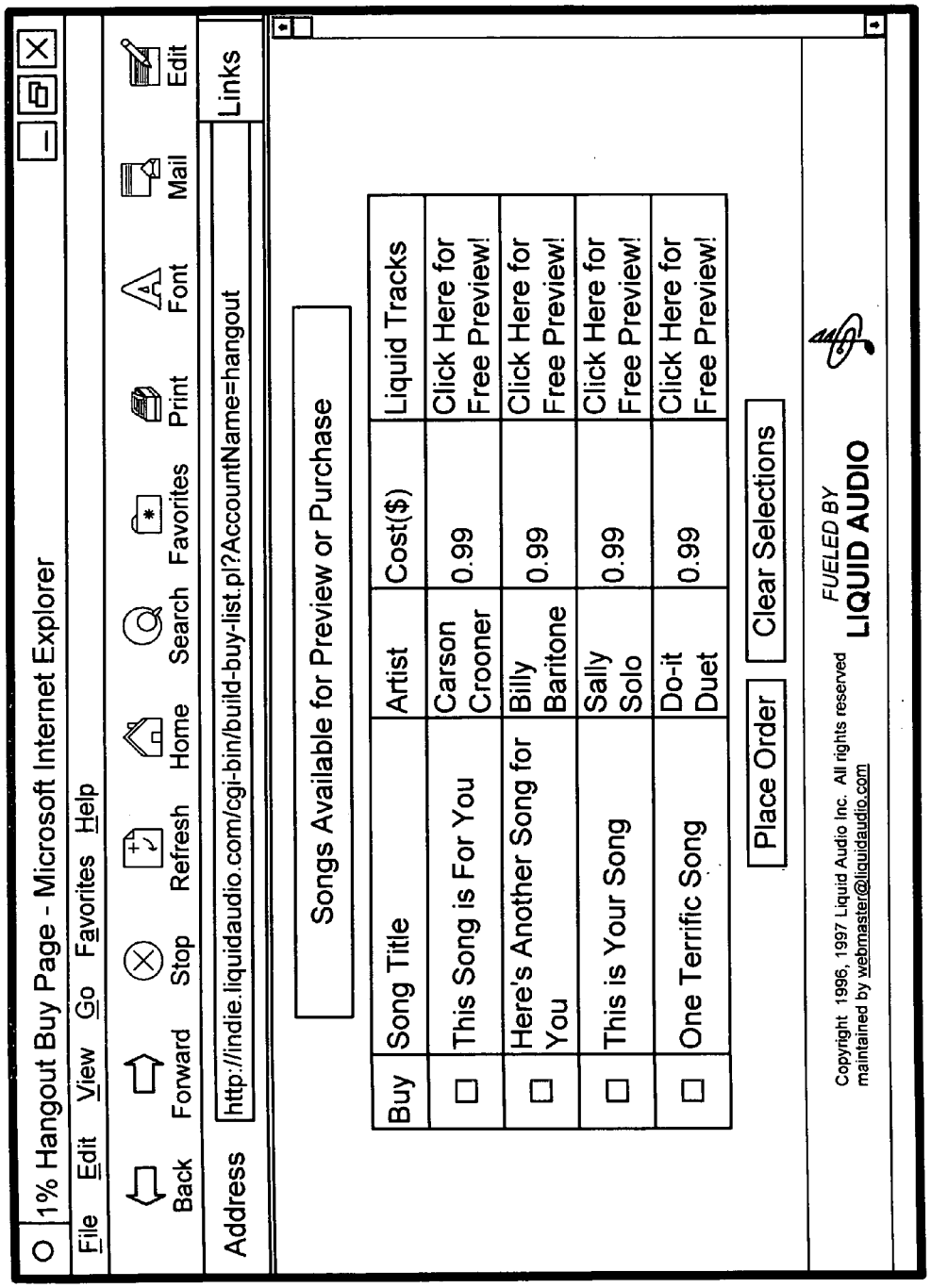
Figure 9A:
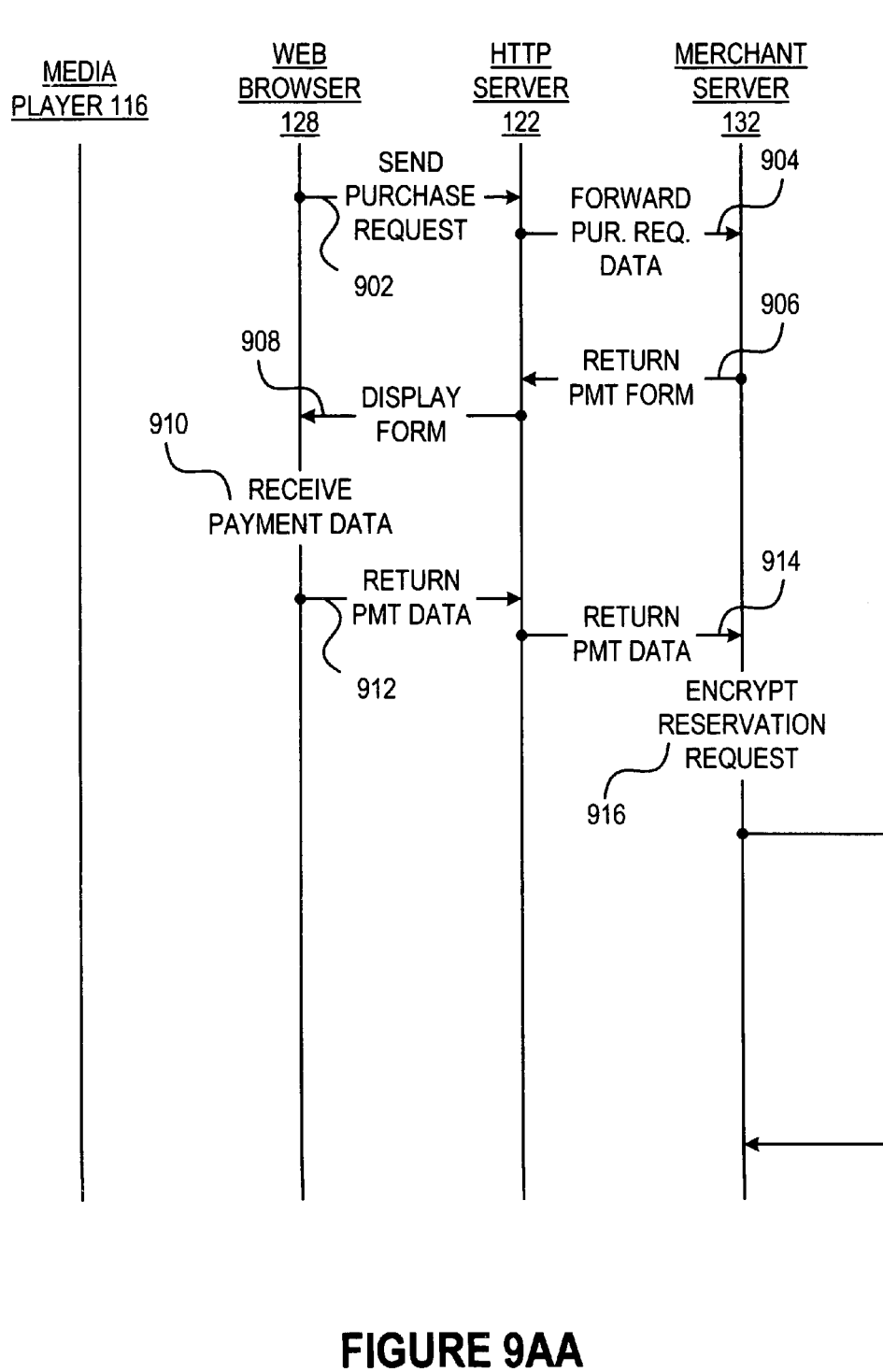
Figure 9C:
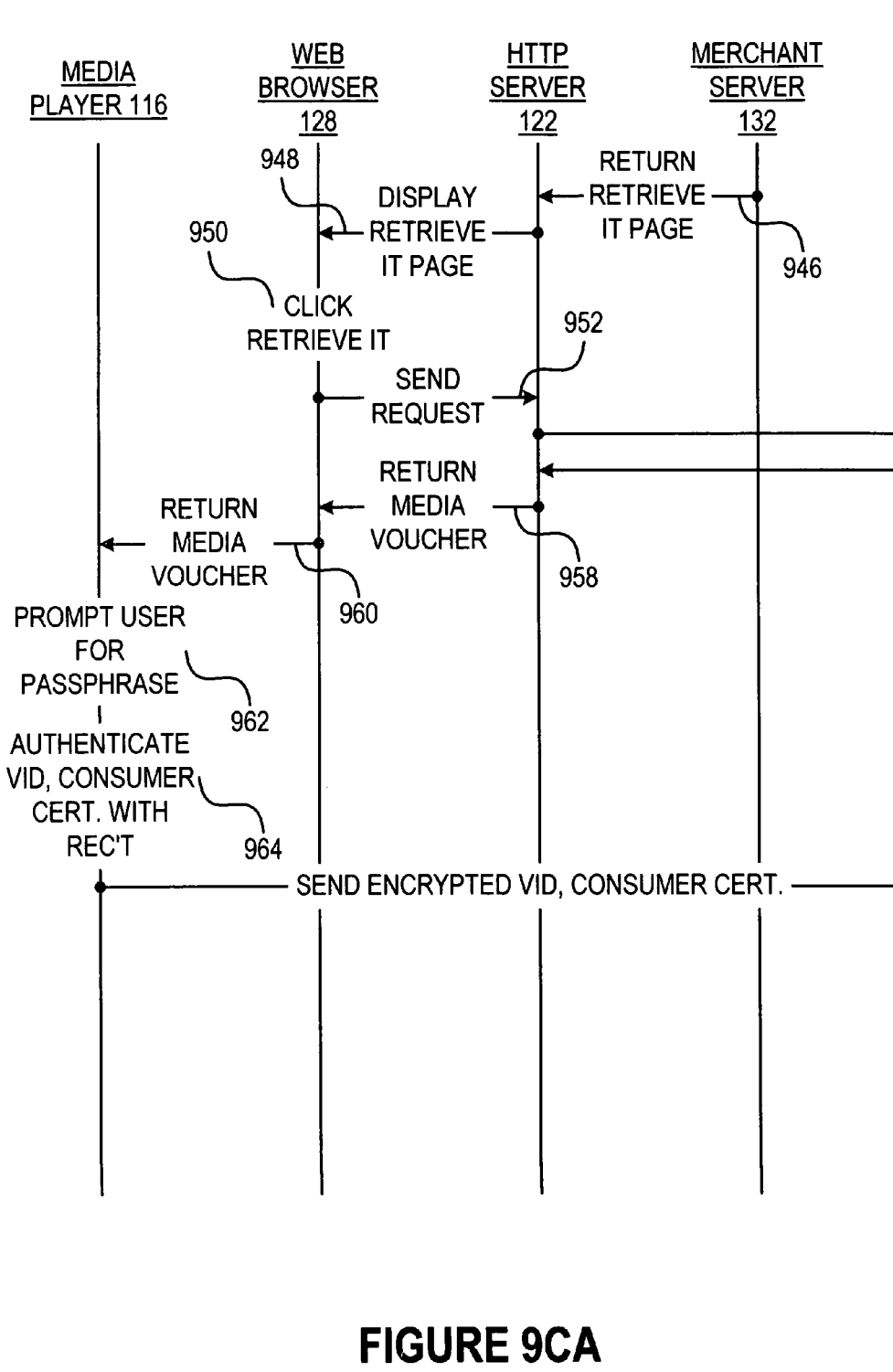
Figure 10:
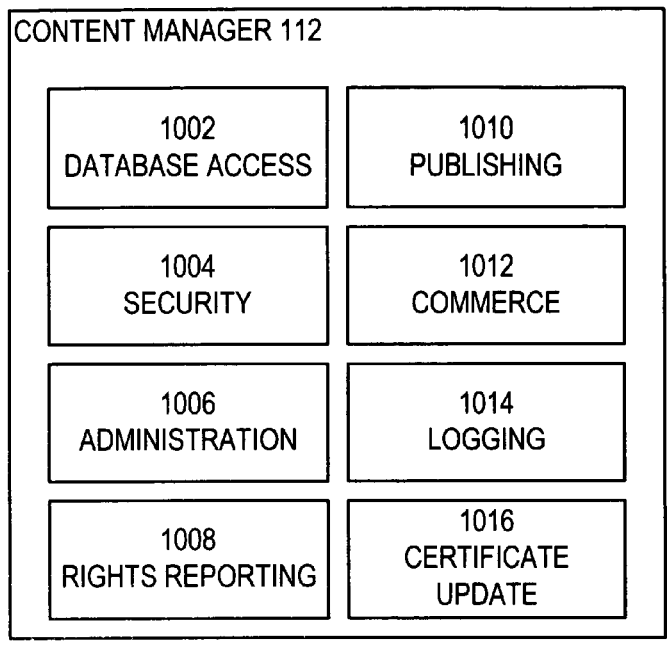
Figure 11:
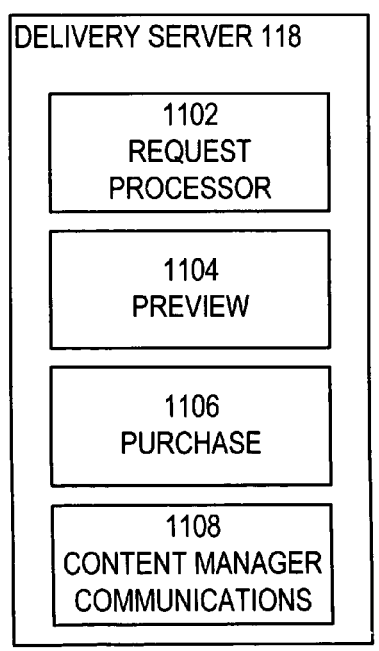
Figure 12:
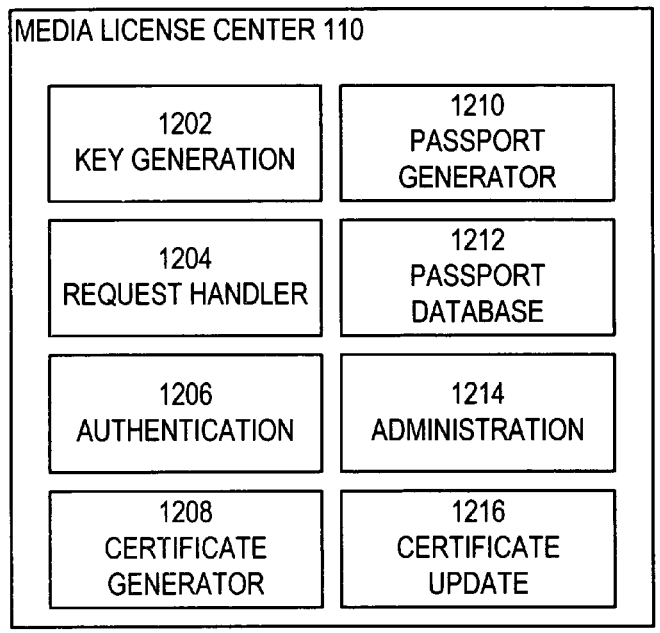
Figure 13:
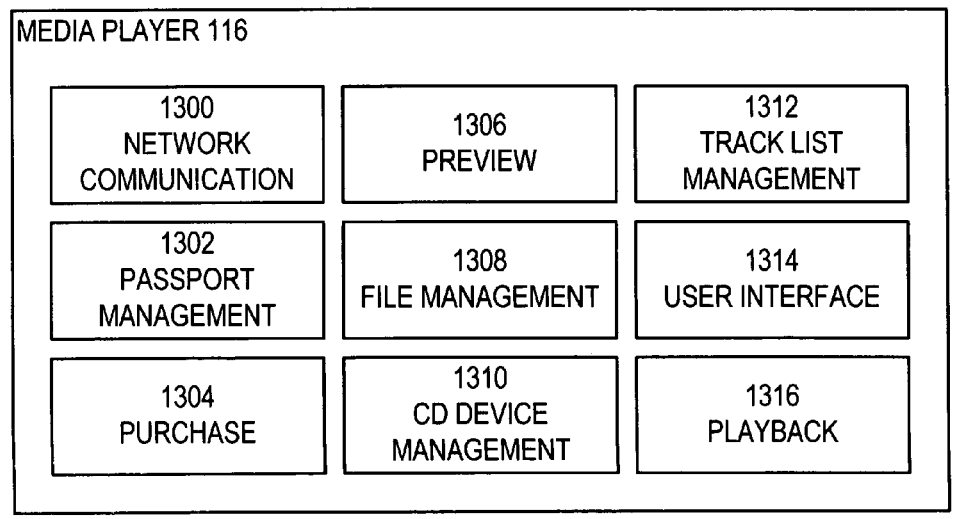
Figure 14:
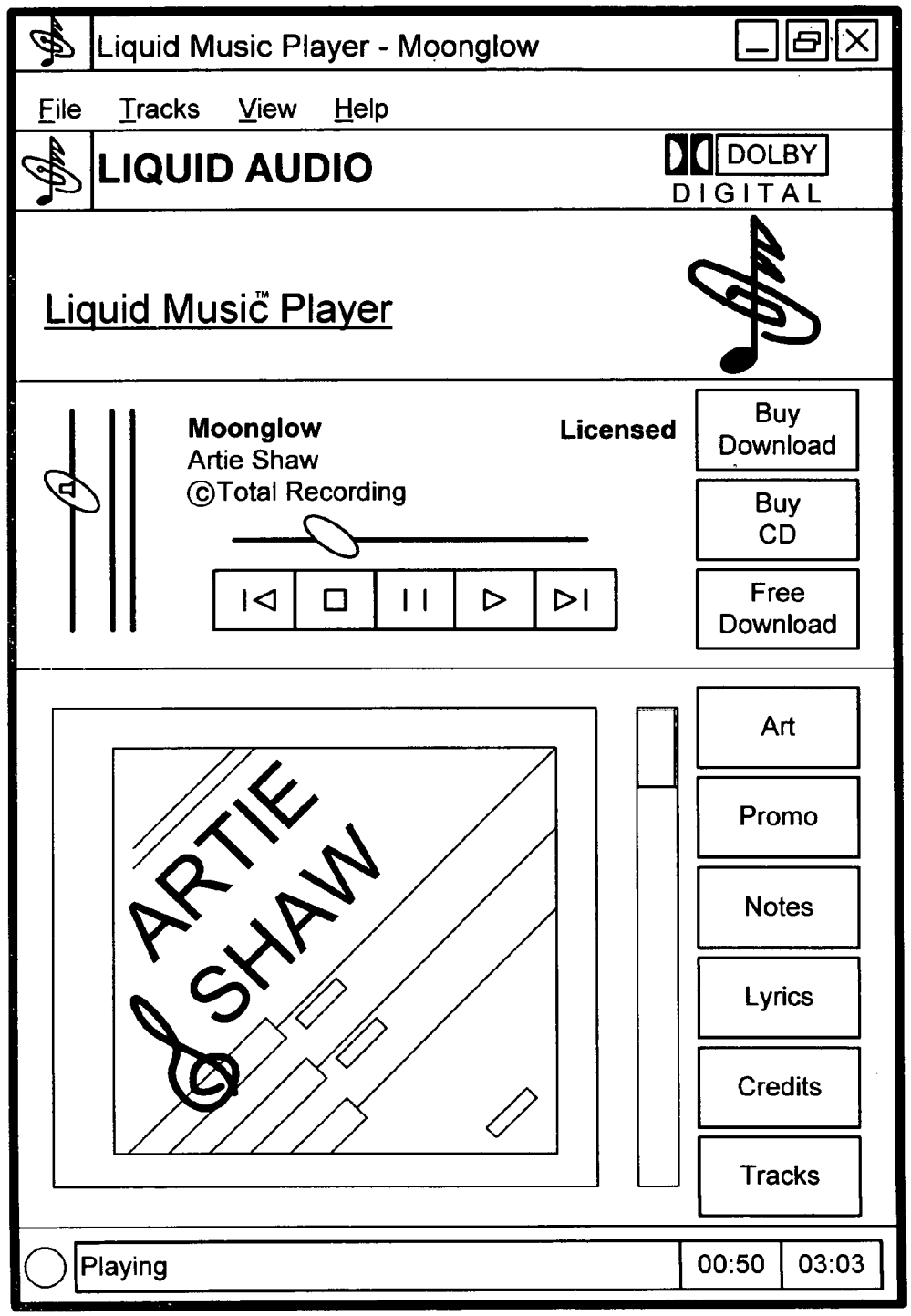

FIG. 1 is an illustration of a secure online music distribution system in accordance with the present invention.
FIG. 2 is an illustration of a media data file.
FIG. 3 is an illustration of a media voucher.
FIG. 4 is an illustration of a passport.
FIG. 5 is an event trace of the publishing process.
FIG. 6 is an event trace of the registration process.
FIG. 7 is an event trace of the preview process.
FIG. 8 is an illustration of a Web page for selecting a preview during the preview process.
FIGS. 9A-D are an event trace of the purchase process.
FIG. 10 is an illustration of the content manager.
FIG. 11 is an illustration of the delivery server.
FIG. 12 is an illustration of the media licensing center.
FIG. 13 is an illustration of the media player.
FIG. 14 is an illustration of one embodiment of the user interface of the media player.

DETAILED DESCRIPTION

System Overview

Referring now to FIG. 1, a secure music distribution system 100 securely distributes music and related media over a public telecommunications network, such as the Internet, employing a client-server architecture. It is appreciated that, while a music distribution system is described, much of the system described herein is equally applicable to distribution of any electronically or digitally stored products including, for example, motion video and computer software. Secure music distribution system 100 includes a music distribution center 124 which operates with any number of client systems 126 and with any number of merchant systems 136. FIG. 1 shows only one of each of client systems 126 and merchant systems 136 for convenience. Music distribution center 124 includes a content manager 112 and at least one delivery server 118. Content manager 112 maintains a media information database 106, a master media file system 120, and a transaction database 130. In addition, the music distribution center 124 interfaces with a media licensing center 110, which in turn communicates with one or more distributed rights agent servers 108 and merchant servers 132. Merchant server 132 executes in a merchant system 136, which also includes an HTTP (HyperText Transfer Protocol) server 122. Merchant servers 132 interface with various payment processing systems 134. Client systems 126 include a media player 116 and a Web browser 128. In a preferred embodiment, there are additional delivery servers and media licensing centers which operate independently and externally to music distribution center 124 and which interface with music distribution center 124 in the manner described herein with respect to delivery server 118 and media licensing center 110, respectively.

Client systems 126 have two basic components: a media player 116 and a Web browser 128. Web browser 128 can be conventional, with the addition of an interface to media player 116 for passing information to media player 116.

Music distribution center 124 operates on server-class computer systems, such as Sun Microsystems SPARCstations™ executing UNIX™ based operating system, or Intel Pentium™ based computers executing Microsoft Corporation's Windows NT™ operating system. Media player 116 is a software product capable of executing on a variety of computer platforms, also including Apple Computer, Inc.'s Macintosh™ systems executing Apple's MacOS™ operating system, and Intel Pentium based computers executing Microsoft Corporation's Windows95/98 or Windows NT operating systems.

Music distribution system 124 communicates with the various other components such as client systems 126, media licensing centers 110, merchant servers 132, authoring tools 102, and rights agents 108 over a public communication network, preferably the Internet, using conventional TCP/IP communication protocols for insecure channels, and a secure protocol over TCP, such as Netscape Communication Inc.'s Secure Sockets Layer v. 3 (SSL), for secure communications. Web browser 128 of client system 126 interfaces with music distribution center 124 via the World Wide Web portion of the Internet using conventional HTTP and HTTP over SSL, and HTTP server 122 of merchant system 136.

Data Objects

Secure music distribution system 100 separates the management and administration of the purchase of the digital products from the delivery of those products to purchasers. This separation is supported in two ways. First, the administration and management of all purchases and other transactions is handled primarily by content manager 112, and the delivery of the purchased media content is provided by delivery servers 118. Second, three distinct data objects are used to encapsulate the information used in various stages of the various transactions. The first data object is the media data file in which media content is stored and which is encrypted when purchased using encryption keys of the purchasers. The second data object is a media voucher object which encapsulates information specific to an individual transaction, including the media data being purchased and the one of delivery servers 118 which delivers the media data. The third data object is a passport object which provides a link between the first two data object and which encapsulates the user's personal confidential information and encryption keys.

Media Data File

Referring now to FIG. 2, a media data file 200 in accordance with one embodiment of the invention is shown. Media data files such as media data file 200 are stored in master media file system 120 (FIG. 1). Media data file 200 is illustrative and includes the following data fields, each of which stores data representing a component of media data file 200:

Header 202 generally defines the information needed to decode media data file 200. This information includes a file format version, the location of the table of contents 222 within media data file 200 expressed as an offset, and security information, such as authentication information including a digital signature of data extracted from media data file 200.

Media descriptive data 204 includes text and image data associated with the audio content of media data file 200. These data include descriptive text, such as title, artist, lyrics, and liner notes, promotional art image data, and cover art image data. These data are preferably digitally signed to prevent them from being changed. The author of the file can encrypt individual components of media descriptive data 204 while leaving other components un-encrypted. Such allows the liner notes and credits data, for example, to be freely viewed by potential purchasers, and thereby allows such potential purchasers to determine whether the audio content of media data file 200 is appealing, while ensuring other data that have commercial value, such as lyrics, are viewable only by purchasers.

Media data file 200 contains at least one media data chunk 206. Each media data chunk 206 includes an audio image 208 which is optionally watermarked, compressed, and/or encrypted. Various audio images 208 or respective media data chunks 206 is processed to provide various quality levels on playback, using various sampling rates and compression levels. Each audio image 208 encodes either an entire song or a portion thereof. Use of a number of different audio images 208 of differing audio qualities allows the artist to a provide a single media data file 200 representing various versions of the same song such that the song can be previewed by users of different platforms and different audio playback capabilities. Data chunk 206 also includes optional restrictions on such actions as playback and record to external devices or files.

Watermarking Audio image 208 is performed by inserting additional data directly into the audio data stream prior to compression. A suitable watermark is implemented, for example, with Solana Technology of San Diego, Calif. Alternatively, watermarking is accomplished in the manner described in copending U.S. patent application Ser. No. 09/172,583 by Earl Levine entitled "Robust Watermark Method and Apparatus for Digital Signals" filed Oct. 14, 1998 and that description is incorporated herein by reference. Compression of the audio images 208 is preferably provided through the use of a high-quality compression algorithm. Each algorithm has a unique identifier to allow the system to operate with multiple compression formats. Compression can be provided, for example, using Dolby Laboratories, Inc.'s AC-3 compression algorithm.

Audio image 208 is encrypted with a symmetric media key, which is generated by authoring tool 102 (FIG. 1), and is preferably a cryptographically strong random number. In this illustrative embodiment, encryption algorithms by which audio image 208 (FIG. 2) is encrypted include DES and RC4. Encryption with a symmetric media key enables audio image 208 to be decrypted in real time as the substantive content of audio image 208 is played back by the media player 116 (FIG. 1). Real time decryption reduces the amount of the audio image 208 (FIG. 2) that is available in a memory buffer in un-encrypted form at any given moment, and thereby reduces the probability of unauthorized access to the audio image.

As further explained below, the media key is separately encrypted with the public key of content manager 112 (FIG. 1) while media data file 200 (FIG. 2) is stored in master media file system 120. When media data file 200 is to be delivered to a purchaser, the private key of content manager 112 is used to encrypt the media key, and the media key is then re-encrypted with the public key of the user's media player 116. This locks the media key, and hence audio image 208 to the purchaser's media player 116.

For each audio image 208, media data chunk 206 includes encryption parameters 210, such as DES initialization vectors.

Media data chunk 206 also includes an index table 212 for the audio image 208 that defines timing information for the image, to allow a media player 116 (FIG. 1) or delivery server 118 to randomly access any portion of the audio image during play back or streaming. The index table 212 (FIG. 2) can be implemented as an array of timing data and location information.

Clip and song information 214 defines the duration, starting time of a clip in song, and the duration of the song itself, along with fade-out and fade-in parameters, which are preferably the duration of each fade; the actual fade is then implemented by the media player 116. The clip audio data is not encrypted. This enables a prospective purchaser to preview a portion of the song.

A "For-Sale" flag 216 defines whether the media chunk 206 is for sale, or can only be previewed.

A timestamp 218, such as an SMPTE timestamp, is provided for editing media data file 200 with professional audio editing tools.

A transaction ID 220 is added to each copy of media data file 200 that is delivered to a purchaser. Transaction ID 220 is used to uniquely identify each copy of a media data file 200 that is purchased, and is added to media data file 200 by media player 116 upon receipt. Transaction ID 220 preferably includes a media voucher ID, a timestamp of the time of delivery to the media player 116, a certificate serial number of content manager 112 as the content manager authorizing the delivery of media data file 200, and the certificate of media player 116 as the media player receiving media data file 200.

Finally, media data file 200 includes a table of contents 222 for the entirety of media data file 200. Table of contents 222 includes the location of each item of data in media data file 200, and its type and subtype. Types include text, audio and graphics. Text subtypes include artist, title, lyrics, liner notes, and other text information. Graphic subtypes include cover art, advertisement art, and promotional art.

Media Voucher

The media voucher is an object that is used to control the purchase and preview of media data files such as media data file 200. For each purchase or preview of media data file 200, a new media voucher is created by content manager 112 (FIG. 1) and is provided to media player 116. The media voucher is used by media player 116 to identify both the specific media data file to be acquired, e.g., media data file 200 (FIG. 2), and the delivery server to provide the media data file, e.g., delivery server 118.

Referring now to FIG. 3, a media voucher 300 includes a unique voucher ID 302 which is generated by the content manager 112 (FIG. 1), and a media ID 304 (FIG. 3) that uniquely identifies the media data file to be delivered, e.g., media data file 200 (FIG. 2). Voucher ID 302 (FIG. 3) limits the use of media voucher 300 to a single purchase or preview transaction. A receipt 306 is a cryptographically strong random number generated by content manager 112 (FIG. 1) which is used to create a message authentication code (MAC) of the voucher ID and consumer certificate to bind the delivery of the media data to the purchase transaction. Preferably, the MAC is a keyed message authentication code as defined in Internet RFC 2104. A delivery server address 308 specifies the IP address and TCP port of a delivery server, e.g., delivery server 118, that will provide media data file 200 to the user's media player 116.

Media voucher 300 can include more than one of each of items 302-308 to represent multiple purchases. Such multiple purchases can be, for example, all songs of a particular album.

Passport

The passport is a data object that provides the security information particular to each user of the system. Each user is issued a passport by media licensing center 110 (FIG. 1) during the registration process. The passport is stored on the user's computer and used during playback to decrypt the media key for each media data file 200 purchased by the user. Whereas encrypting the media key of a purchased media data file 200 with the public key of a user's media player 116 binds the media data file 200 to a specific user, the user's passport in turn enables the user to decrypt the file and play it back on her media player 116. Further, the passport includes confidential personal information of the user, and this deters the user from freely copying and distributing her passport to others.

Referring to FIG. 4, a passport 400 in accordance with the present invention includes a consumer certificate 402, a consumer public key 404, a consumer private key 412, encrypted personal information 414, and a registration key 420. Consumer certificate 402 is used to authenticate the purchaser of a media data file 200, and consumer public key 404 is used to encrypt portions of a purchased media data file 200. Consumer certificate 402 is preferably in the known and conventional ITU-T X.509 format, and issued by a trusted certificate authority, which in the preferred embodiment is media licensing center 110. Each consumer certificate 402 in the ITU-T X.509 format includes a consumer public key 404, set of validity dates 406 defining the period during which the certificate is valid, a serial number 408, and a digital signature 410 of certificate authority, e.g., media licensing center 110.

Consumer private key 412, along with public key 404 are generated by media licensing center 110 (FIG. 1). Generation of the key pair by media licensing center 110 is desirable to simplify recovery of the private key if the consumer loses it, to eliminate the need for key generation by media player 116, thereby simplifying media play 116, and to simplify the registration protocol. Simplification of media player 116 is important since media player 116 must generally be downloaded and installed by the user's client computer system, which typically has less processing capability than server computer systems within media licensing center 110.

Passport 400 (FIG. 4) further includes personal and confidential information 414. This information preferably identifies the user and can include, for example, the user's name 416 and other similar information (e.g., address). In addition, personal and confidential information 414 includes information which the user would typically prefer to keep confidential, such as a credit card number 418 or similar information. This personal and confidential information is displayed by the media player 116 during playback of the substantive audio content of the media data file 200. Such technique discourages the user from giving copies of passport 400 to other people for unauthorized sharing of media data file 200 since such would display personal and confidential information 414 to those people.

Consumer private key 412 and personal information 414 are encrypted with a user's registration key 420. This key is also generated by media licensing center 110 (FIG. 1). Registration key 420 (FIG. 4) is stored in passport 400 encrypted using a passphrase entered by the user during the registration process.

When a user purchases a media data file 200 (FIG. 2), consumer certificate 402 (FIG. 4), which includes public key 404, is provided to content manager 112 (FIG. 1). Content manager 112 uses public key 404 (FIG. 4) to encrypt the media key of media data file 200 (FIG. 2) for delivery to media player 116 (FIG. 1). When media player 116 receives media data file 200 (FIG. 2) and the encrypted media key, media player 116 (FIG. 1) uses registration key 420 (FIG. 4)

to decrypt private key 412 to decrypt the media key, which is then used to decrypt the audio image itself. Media player 116 (FIG. 1) further uses registration key 420 (FIG. 4) to decrypt personal information 414 which is then displayed to the user. The user is required to enter the previously entered passphrase upon playback in order to decrypt registration key 420.

Component Overview

Content Manager

Content manager 112 (FIG. 1) is all or part of one or more computer processes and is the central transaction processor of the music distribution center 124, and is responsible for the overall management and administration of the substantive content of media data files. Such management and administration includes (i) the receipt and storing of published media data files 120 such as media data file 200 (FIG. 2) from various authors, (ii) the management of preview and purchase transactions by individual users of media data files including the encryption of media data files 200 in a manner that allows only a particular user to access the media for playback, and (iii) the reporting to rights agents of purchases and other uses of media data for proper compensation of authors of fees and royalties from such uses. Content manager 112 (FIG. 1) stores details of each transaction in the transactions database 130.

Merchant Server

Merchant server 136 is all or part or one or more computer processes and permits preview and purchase transactions to be conducted remotely of content manager 112 while content manager 112 maintains full control of access to digital products such as media data files 200 in master media files 120. Such allows content manager 112 to act as a clearinghouse for digital products of master media files 120 while enabling various merchant systems, such as merchant system 136, to act as a virtual store front—offering product information and conducting sales. Such merchant systems can also offer products other than those managed by content manager 112 and stored in master media files 120.

To conduct purchase and preview transactions, merchant system 136 requires general information about those of the digital products stored in master media file 120 which are available through merchant system 136. Accordingly, as part of an initialization process, content manager 112 provides to merchant system 136 inventory data which identifies selected digital products of master media file 120, e.g., media data file 200 (FIG. 2), which content manager 112 (FIG. 1) is willing to deliver to client computer systems on behalf of merchant system 136. Such inventory data also specifies additional information of the selected digital products including, for example, costs charged by content manager 112 for each of the selected digital products and additional details of the digital products. As a result, merchant system 136 can provide sufficient specificity to a prospective purchaser to enable purchasing decisions. Merchant system 136 can mark up prices above the costs specified in the inventory data to make a profit. In an alternative embodiment, the inventory data includes suggested retail prices which merchant system 136 is obligated to charge, e.g., by contractual agreement.

Delivery Server

Delivery server 118 is all or part of one or more computer processes which delivers media data files such as media data file 200 (FIG. 2) to users via media players 116 (FIG. 1) in client system 126. More particularly, delivery server 118 receives requests from media player 116 to preview or purchase media data file 200 which contains audio data, routes such requests to content manager 112 for authentication and encryption, and delivers the requested media data file or the requested portion thereof. Delivery server 118 delivers the requested media data file or portion thereof as a preview by real time streaming of the substantive content of the audio data for immediate playback at media player 116 or as a purchase by securely transferring the media data file to client system 126 for subsequent playback by media player 116 or for recording to CD for playback on conventional CD players.

Media Player

Media player 116 is all or part of one or more computer processes which, in response to user-generated commands according to conventional user-interface techniques, plays back purchased or previewed substantive content of audio data, and which, also in response to user-generated commands, digitally records purchased media data files to an external memory, such as a CD-Recordable, CD-RW, Mini-Disc, or flash memory devices. Media player 116 provides user interface controls for viewing lists of purchased and stored media data files such as media data file 200, viewing cover and promotional art and graphics, reading lyrics and other liner information, organizing play lists and tracklists, and other music database management features. FIG. 14 illustrates an embodiment of the user interface of the media player 116.

Media player 116 (FIG. 1) also stores and manages a user's passport 400 (FIG. 4), and accesses the passport data of passport 400 to decrypt audio images in real time during playback of a requested, streaming audio image.

Media Licensing Center

Media licensing center 110 is all or part of one or more computer processes which collectively form a licensing and certificate authority. New users of secure music distribution system 100 who wish to purchase data from music distribution center 124 must first register with media licensing center 110 to obtain a consumer certificate 402 (FIG. 4), including the public-private key pair. Media licensing center 110 (FIG. 1) is responsible for generating these public-private key pairs on behalf of media player 116 for encrypting media data files 200 (FIG. 2) and other information to be received by media players 116 (FIG. 1) so that only a particular user's media player 116 can decrypt and playback audio image data 208 (FIG. 2) included in a media data file 200 purchased by that user. Media licensing center 110 (FIG. 1) also authenticates new users as they register, and generates certificates that are attached to various media data files by various other components of music distribution center 124 as they are moved through the system to authenticate these components.

Media licensing center 110 also generates the user passports, e.g., passport 400 (FIG. 4).

Among the certificates issued by media licensing center 110 (FIG. 1) are certificates to content manager 112. These certificates are designed to have relatively short validity periods, preferably on the order of 1 to 2 weeks. This short validity period is used to ensure that "pirate" sites, perhaps using a certificate of content manager 112 which is copied without authorization, can be shut down in a timely manner. Accordingly, media licensing center 110 updates the certificate of content manager 112 if the certificate expires.

Finally, media licensing center 110 generates rights reports of the usage of media data files, and communicates such rights reports to rights agents 108.

The foregoing elements are the basic components for secure distribution of music data given a collection of music and other media. In order to form media data files 200 for distribution, authoring tools 102 are used by individual artists to create the audio data and associated media data in media data files 200 to be delivered over the network to content manager 112 for storage in master media data file system 120. Information descriptive of the master media data files is extracted by content manager 112 from each of the master media data files and stored in media information database 106.

Distribution Hub

While an artist can upload a master media file directly to content manager 112 from authoring tool 102, the artist may instead forward a master media file to a distribution hub 104 for augmentation. A distribution hub can be a computer system managed by a recording agency or record label, or other agency, which manages or otherwise participates with the artist in the creation and promotion of the artist's works. Distribution hub 104 can be used to add agent codes which identify the rights agent responsible for receiving purchase and usage information from content manager 112, along with agency identification codes which identify the artist and the media data created by the artist to the agency. For example, agency codes may by the product code or SKU code used by the agency to track each artist's works.

Merchant Server & Payment Processor

A merchant server 132 is an external system that acts as authorized electronic retailer of music and media over the network. Payment processing systems 134 are conventional payment authorization systems, such as credit card authorization systems or debit card payment authorization systems.

Operational Overview

Secure music distribution system 100 according to the present invention and music distribution center 124 provide a number of processes and workflows to support the secure distribution of music and related media. These workflows include:

Publishing: this is the process of transferring master media data files from authoring tools 102 or distribution hub 104 to content manager 112. Once imported and catalogued by content manager 112 into media information database 106, the master media files are generally available for preview and purchasing by individual users.

Registration: each entity in the system registers with media licensing center 110 to obtain a certificate that is used for authentication of identity by the various entities of transferred data. In particular, a user registers to obtain a consumer certificate that is used by content manager 112 to authenticate the identity of a purchaser of a media data file. Authors also register to obtain an author's certificate that is used by content manager 112 to authenticate the author when the author uploads a master media data file for inclusion in master media file system 120. Content manager 112 registers with media licensing center 110 to obtain a certificate that enables content manager 112 to distribute media data files themselves.

Preview: this process is supported by delivery servers 118 and media player 116 to provide a real time streaming of audio data and display of related media data at media player 116. The preview enables the user to decide whether to purchase the entirety of the song for permanent storage on a hard disk of client system 126 and subsequent recording to a CD-R or other portable medium.

Purchase: this process is the transaction of purchasing a media data file from content manager 112 and delivery of the purchased media data file by delivery server 118 to media player 116.

Rights Reporting: The rights reporting process provides a tamper-proof mechanism to securely track electronic music distribution. This process securely uploads usage (purchases, previews and so forth) of media from content manager 112 to various rights agents 108. This uploaded information describes the number of times various media data files have been used and purchased to allow for accurate reporting of such usage for the purpose of royalty payments and other fees to the artists, owners, record labels and so forth. These mechanisms allow music industry participants to protect their copyrights and could be used by rights reporting agencies to bill distributors for royalties associated with the volume of electronic distribution of the media data files.

Publishing

Publishing is the process of distributing media data files 200 from their respective authors to the content manager 112 for inclusion in the music distribution center 124. FIG. 5 shows an event trace of the publishing process. First, in step 502, the artist constructs the media data file 200 (FIG. 2) in the authoring tool 102 (FIG. 1). Generally, individual authors record various musical works into a digital format, and obtain or design cover and promotional art to be incorporated with the music into media data file 200 (FIG. 2). The artist uses authoring tool 102 (FIG. 1) to perform any desired digital signal processing and editing on the digitally recorded audio data. Authoring tools 102 also provide for compression of the audio images, watermarking, and encryption. Authoring tool 102 is also used by the artist to enter the media descriptive data 204 (FIG. 2), such as the artist's name, song title, and lyrics, as previously described.

An artist can include in media data file 200 a number of different audio images 208, each having different quality levels, in terms of bandwidth, as determined by compression level and sampling rate.

Following construction of media data file 200 including encryption of the audio images 208, authoring tool 102 (FIG. 1) establishes a connection with the content manager 112, and transmits the user account name and password of authoring tool 102 as a request for identification of content manager 112 in step 504 (FIG. 5). In step 506, content manager 112 (FIG. 1) responds with the version and certificate of content manager 112. The certificate of content manager 112 includes the public key of content manager 112.

Authoring tool 102 and content manager 112 cross-authenticate each other. Content manager 112 authenticates authoring tool 102 according to the previously transmitted user account name and password. In step 508, authoring tool 102 authenticates content manager 112 as follows. Authoring tool 102 receives a timestamp, the username and password for authoring tool 102 digitally signed by content manager 112. Authoring tool 102 validates the signature to authenticate content manager 112 to authoring tool 102. In step 508 (FIG. 5.), authoring tool 102 (FIG. 1) further validates that the certificate of content manager 112 is signed by the issuing certificate authority, which in this case is media licensing center 110.

In steps 510-514 (FIG. 5), content manager 112 (FIG. 1) authenticates authoring tool 102 in a similar manner: requesting identification of authoring tool 102 (step 510), receiving the version and certificate of authoring tool 102, including the public key of authoring tool 102, and encryption information of authoring tool 102 (step 512), and verifying the certificate and encryption information (in step 514). Other authentication protocols can also be used between authoring tool 102 and content manager 112, such as MIT's Kerberos system.

Once the cross-authentication is complete, authoring tool 102 (FIG. 1) sends to content manager 112 a filename and length of media data file 200 in step 516 (FIG. 5). In addition, authoring tool 102 generates, in step 518, one or more media keys for media data file 200. In one embodiment, a single media key corresponds to the entirety of media data file 200. In an alternative embodiment, a single, distinct media key corresponds to each of media data chunks 206 (FIG. 2). The media keys generated by authoring tool 102 (FIG. 1) are preferably cryptographically strong random numbers. The media keys are used to encrypt audio images 208 (FIG. 2).

Authoring tool 102 (FIG. 1) encrypts the media key with the public key of content manager 112 using the specified encryption algorithm in step 520 (FIG. 5). At this point, only content manager 112 (FIG. 1) can decrypt the media key, and hence decrypt audio images 208 (FIG. 2). In step 522 (FIG. 5), authoring tool 102 (FIG. 1) encrypts the audio images of media data file 200 using the media in its original, unencrypted state. In step 524 (FIG. 5), authoring tool 102 (FIG. 1) transmits the encrypted media key, and in step 526 the complete media data file 200 (FIG. 2) with audio images encrypted, to content manager 112 (FIG. 1).

In step 528, content manager 112 (FIG. 1) receives media data file 200 (FIG. 2) and extracts therefrom the media descriptive data. In step 530, content manager 112 (FIG. 1) updates media information database 106 with a new entry for media data file 200. Content manager 112 stores media data file 200 in master media data file system 120 in step 532. If 'For sale' flag 216 (FIG. 2) of the new media data file 200 is set, media data file 200 is ready for purchase by a consumer. The security of media data file 200 in the master media data file system 120 is provided by the persistent encryption of the individual media keys for each media data file 200 with the public key of content manager 112. Additional security for the private key of the content manager 112 can be provided by tamper-proof hardware, for example, GTE Internet working/BBN's SafeKeyper Signer product.

Registration

Registration establishes an identity for the purchaser that is trusted by music distribution center 124, for engaging in later transactions. FIG. 6 shows an event trace 600 of the process of registration by a user.

Upon start up, media player 116 checks for the existence of the user's passport 400 (FIG. 4) containing the user's private key in step 602 (FIG. 6). If passport 400 (FIG. 4) does not exist, media player 116 (FIG. 1) will launch Web browser 128, providing a URL to a registration page of media licensing center 110's HTTP server in step 604 (FIG. 6). In step 606, Web browser 128 (FIG. 1) requests the registration page. In response, media licensing center 110 returns the HTML registration page in step 608 and the registration page is displayed by Web browser 128.

The registration page is a form that collects the personal information necessary to register the user. HTML forms are well-known and prompt the user to enter data using conventional user-interface techniques. The personal information includes full name, billing address, telephone number, email address, credit card number and expiration date. Other personal information that can be collected includes, for example, a driver's license number. The user enters this data using Web browser 128, and presses, for example, a Register button, which sends the registration data to media licensing center 110 in step 610. This information is preferably transmitted over a secure communication link, such as Netscape Communications, Inc.'s Secure Sockets Layer v. 3.

Media licensing center 1110 extracts and verifies the credit card information by requesting a credit card authorization from a payment processor 134 in step 612. Data representing a credit authorization is returned to media licensing center 110 in step 614 if approved by payment processing system 134. If the credit card is not approved, media licensing center 110 returns a page to Web browser 128 with an error message, and requests corrected information.

Once the credit card is authorized, media licensing center 110 generates a new passport, e.g., passport 400 (FIG. 4), for the user's media player 116 (FIG. 1) in step 616 (FIG. 6). Media licensing center 110 (FIG. 1) generates a public/private key pair to be the consumer's public key 404 and private key 412. Media licensing center 110 formats the passport 400 as a file, including:

(a) a certificate chain, which includes a hierarchy of certificates, serially signed. The certificate chain begins with the certificate of media licensing center 110 player certificate authority and terminates with consumer certificate 402.

(b) a consumer certificate 402, signed by media licensing center 110, including the generated public key 404.

(c) the consumer's private key 412, encrypted with a cryptographically strong, randomly generated registration key 420.

(d) the consumer personal information 414, also encrypted with the registration key.

(e) the registration key 420 in cleartext.

The consumer's private key 412 and personal information 414 is also digitally signed by the private key of media licensing center 110 to prevent tampering.

In step 618 (FIG. 6), passport 400 (FIG. 4) is returned to Web browser 128 (FIG. 1) over the secure connection, with a predefined MIME type that identifies passport 400 to Web browser 128 as being data for media player 116. In step 620, Web browser 128 passes passport 400 to media player 116.

In step 622, media player 116 validates passport 400 for authentication and tamper detection by authenticating the certificate chain. The certificate chain is authenticated by starting with a root certificate of media licensing center 110 that is stored in media player 116, using the public key of the root certificate to decrypt a hash of the certificate and compare that decrypted hash with a newly generated hash. If the hashes are identical, the next certificate is authenticated in a same manner.

Once passport 400 is validated, media player 116 prompts the user to enter a passphrase for the registration key in step 624. Media player 116 encrypts registration key 420 with the user-supplied passphrase in step 626. In this illustrative embodiment, registration encryption is implemented with R.S.A. Data Security, Inc.'s BSAFE PBE (MD5+DES) algorithm.

In step 628, passport 400 is stored in the local file system of client computer 126. Passport 400 can be stored in a default location, or a user-specified one. The file format of passport 400 is operating system independent to provide for portability of passport 400 between Microsoft Corp.'s Windows operating systems and Apple Computer Inc.'s MacOS.

The user is now authorized to purchase and preview music from secure music distribution system 100 (FIG. 1).

In this illustrative embodiment, the passphrase, while stored in memory of client system 126, and the decrypted private key should be secure from unauthorized copying by malicious programs and/or applets such as ActiveX and JavaScript applets. Such unauthorized copying could enable transmission of such confidential information to an unauthorized entity in the wide area network of secure music distribution system 100 and could therefore represent a significant breach of security. In addition, while media player 116 is active, the media key should remain encrypted as much as possible, e.g., should be decrypted only immediately prior to use of the media and should be re-encrypted immediately after such use.

If either registration key 420 or the passphrase that encrypts registration key 420 is lost, registration key 420 can be sent again from media licensing center 110 to media player 116 via the SSL connection of Web browser 128 to a Web server on media licensing center 110.

Media licensing center 110 maintains a persistent database of all consumer certificates issued, including personal information 414 associated with each certificate.

Preview

FIG. 7 shows an event trace 700 of previewing a media data file 200 prior to purchase.

Previewing begins with the user viewing a Web page in Web browser 128 that has a link to a preview of a desired media data file 200. FIG. 8 illustrates an exemplary Web page for selecting a preview. The link is to HTTP server 122, and when clicked, Web browser 128 requests from HTTP server 122 a preview of a media data file 200 in step 702 (FIG. 7). The URL for the link encodes the media ID and type of request, whether for a clip or the entire song.

HTTP server 122 receives the preview request, and invokes in step 704 content manager 112 via a TCP connection, which can be insecure, passing the media ID and request type, here a preview type request.

Content manager 112 receives the preview request, and in step 706 validates that media data file 200 specified by the media ID exists. In an illustrative embodiment, this is done by accessing first a cache of media IDs of frequently accessed songs. If the requested media ID is not present in the cache, content manager 112 then checks master media file system 120 for requested media data file 200. If the media data file 200 is not present here, content manager 112 returns an error.

Assuming content manager 112 confirms the existence of requested media data file 200, content manager 112 determines in step 708 whether a delivery server 118 is available to handle request to preview the file.

In this illustrative embodiment, each delivery server 118 is licensed and configured by the system provider to have a limited number of active streams of data being delivered at any one time. Content manager 112 maintains a list of the delivery servers 118 with which content manager 112 operate, and the number of active streams and total streams for each delivery server 1118. Each delivery server 118 registers with content manager 112, providing the network address of delivery server 118. Content manager 112 configures each registered delivery server 118 with the number of stream allocated to delivery server 118, the base UDP port to be used for the streams, and a port number for accepting streaming requests.

When delivery server 118 allocates a stream, delivery server 118 updates content manager 1112 with this information. Accordingly, to determine availability of a delivery server 118, the content manager checks this list for the first available delivery server 118 which does not have all streams allocated. If no streams are available, content manager 112 returns a message to Web browser 128 indicating that the preview cannot be delivered at the present time.

Assuming content manager 112 identifies an available delivery server 118, content manager 112 generates and returns to HTTP server 122 a media voucher 300 in step 710. This includes the network address 308 of delivery server 118 and port number, voucher ID 302, and media ID 304.

In step 712, HTTP server 122 generates and returns to Web browser 128 an HTTP response embedding the media voucher data. A MIME type is defined that causes Web browser 128 to invoke media player 116 with the response data.

In step 714, Web browser 128 receives the HTTP response and stores the data of media voucher 300 in a local file. Web browser 128 passes the file name of this file to media player 116 in step 716.

In step 718, media player 116 receives the file name of media voucher 300, reads the file, extracts for each track in media voucher 300 the following information: delivery server address 308 and port, voucher ID 302 and media ID 304. Media player 116, in step 720, sets up communication channel with the specified delivery server 118 and passes in the voucher ID 302 and the media ID and bandwidth requirement, which is an estimate of the Internet connection bandwidth of media player 116. Media player 116 provides port information identifying which ports media player 116 is to receive the streamed audio data from delivery server 118.

In step 722, delivery server 118 receives the voucher ID and media ID and contacts content manager 112 to obtain the media information from the media information database 106. Delivery server 118 specifies to the content manager 112 the media ID for the media data file 200, and the number of, and specific types of information to be retrieved from the media descriptive data 204. This step is to obtain the most current information about media data file 200, in case there have been any updates, for example to the price information or other data. Content manager 112 responds with media information of each requested type in step 724.

In step 726, delivery server 118 transmits the media information to media player 116. This information informs media player 116 of the duration of the clip or song, data size of the encoded audio to be delivered, starting and ending times of the clip, fade-in and fade-out durations, and bandwidth.

In step 728, delivery server 118 streams media data file 200 to media player 116. To stream media data file 200, delivery server 118 notifies content manager 112 that delivery server 118 is allocating one of its streams for a particular request by providing to content manager 112 voucher ID 302 of media voucher 300, the network address of media player 116 which is to receive the stream, the transport protocol—e.g., TCP or UDP, the bandwidth requested by media player 116, and the media ID of requested media data file 200.

In step 730, media player 116 receives the streamed media data file 200 and plays the substantive content of the audio image according to the provided media information parameters. At any time, the user can instruct media player 116 to stop the stream and download any free data over the same connection. When streaming is completed, delivery server 118 notifies content manager 112 to release the stream, indicating the voucher ID 302, the status of the stream, the duration of the song that was played by the consumer, and which audio image 208, if any, was downloaded to media player 116.

The user interface of media player 116 supports controls to control the streaming of the audio, including fast forward, rewind, pause, and stop controls. To implement these controls, media player 116 and delivery server 118 use a time-based transport protocol. Media player 116 sends transport instructions to delivery server 118 that specify a time offset within an audio image at which to begin playing. Delivery server 118 then either advances or rewinds to the specified time. Fast forward user controls cause fixed increments of time advance, and rewind controls cause fixed decrements of time. Negative time values are used to indicate stopping and resuming play.

Media voucher 300 can include a play list of more than one track. Accordingly, media player 116 repeats steps 720-730 for each track of media voucher 300.

Purchase

FIGS. 9A-D show an event trace 900 of purchasing a media data file 200 for persistent storage and playback by a user's media player 116.

First, the user views in Web browser 128 some form of menu, catalogue, index or other listing of music and media available for purchase which can be similar in form to the preview listing of FIG. 8. From the user's Web browser 128 (FIG. 1), a purchase request for a specific song is sent to HTTP server 122, for example by the user clicking on a "Buy It" button, in step 902 (FIG. 9A). The button generates a URL including the media ID of the song to be purchased. For example, an invocation of the HTTP server 122 (FIG. 1) can look like:

https://web-server-addr/cgi-bin/purchase?mid=MID where web-server-addr is the hostname or IP address and TCP port of the HTTP/SSL server and MID is the media ID.

In step 904 (FIG. 9A), HTTP server 122 (FIG. 1) forwards the purchase request data to a merchant server 132 to initiate authorization for payment for the requested media data file, e.g., which is media data file 200 (FIG. 2) in this illustrative example. A preferred implementation uses a secure connection to transfer this data.

Payment information is preferably collected at this time. In step 906 (FIG. 9A), merchant server 132 (FIG. 1) generates a payment request form and transmits this form back to HTTP server 122 which sends the form in step 908 (FIG. 9A) for display by Web browser 128 (FIG. 1).

In step 910 (FIG. 9A), the user completes the form by entering data which authorizes payment for the requested media data file. Typically, such payment authorization data includes the user's name, credit card account number, and credit card expiration date. For example, an invocation of HTTP server 122 (FIG. 1) can look like:

https://web-server-addr/cgi-bin/
ccinfo?cc=CCNO&exp=DATE&Mid=MID.

where CCNO is a credit card number, and DATE is the expiration date of the credit card.

In step 912 (FIG. 9A), Web browser 122 (FIG. 1) securely transmits this payment authorization data back to HTTP server 122, which passes the data to merchant server 132 in step 914 (FIG. 9A). If payment information is not collected at this stage then payment information is collected after a reservation has been generated as described more completely below.

In this illustrative embodiment, HTTP server 122 and merchant server 132 execute in merchant system 136 and collectively serve requests for purchases and preview of audio content stored in master media files 120. In addition, master media files 120 are located remotely, e.g., in music distribution center 124. As described above, such allows an operator of merchant system 136 to offer and process transactions for digital products while those digital products are stored elsewhere in a wide area network. As a result, interaction between HTTP server 122 and merchant server 132 of merchant system 136 and content manager 112 of music distribution center 124 is through a publicly accessible wide area network, e.g., the Internet. Accordingly, in step 916 (FIG. 9A), merchant server 132 (FIG. 1) establishes a secure connection to content manager 112, preferably with X.509 certificates for authentication and key exchange and cryptographically strong random numbers as session encryption keys. Once the secure connection is established, merchant server 132 encrypts a reservation request for content manager 112 using the session key. The reservation request specifies the requested media data file 200 and includes the media ID of the requested media data file 200 and a requested quality level that in turn includes information such as a bit rate and number of channels in the audio image. In step 918 (FIG. 9A), merchant server 132 (FIG. 1) sends the encrypted reservation request to content manager 112. In step 920 (FIG. 9A), content manager 112 (FIG. 1) decrypts the reservation request and, in response thereto, verifies that the requested song at the specified quality level actually exists in master media files 120 and is available for purchase.

Content manager 112 looks up the received media ID in media information database 106 to confirm that the requested song exists and is available for purchase. If the media data file 200 identified by the media ID exists in the database, content manager 112 forms and encrypts for merchant server 132 a voucher packet in step 922 (FIG. 9A). Otherwise, content manager 112 (FIG. 1) returns a message indicating the media ID does not correspond to a known media data file 200 or that the corresponding file is not available for sale; this information is communicated back to Web browser 128 via HTTP server 122. In step 924 (FIG. 9A), content manager 112 (FIG. 1) sends the encrypted voucher packet which is decrypted by merchant server 132 in step 926 (FIG. 9B). In one embodiment, the encryption and decryption of the reservation request and returned voucher packet is performed as an integral part of a secure communication link, such as Netscape Communications, Inc.'s Secure Sockets Layer v. 3, between merchant server 132 (FIG. 1) and content manager 112.

The voucher packet includes a voucher ID generated by content manager 112 to track the reservation, a timestamp marking the start of the reservation, an expiration lifetime specifying a time at which the reservation becomes invalid, a delivery authorization token that marks reservation as authorized, or as unauthorized in order to remove the reservation. Finally, the voucher packet includes a receipt token, which is returned in the media voucher to media player 116 for initiating download of the requested media data file 200 from delivery server 118. The delivery authorization token is a secret token between content manager 112 and merchant server 132 and is not revealed to the user. This token and the receipt token are preferably cryptographically strong random numbers.

Content manager 112 updates transaction database 130 to include a new entry with the data from the voucher packet. This data is used subsequently to authenticate a download request from media player 116 against a validated purchase. More particularly, content manager 112 maintains three sets of data regarding reserved and available for retrieval media files:

(i) Pending purchases. These are media data files 200 that are reserved but not yet authorized for delivery;

(ii) Purchased and not delivered. These are media data files 200 that have been authorized for delivery and for which a receipt token has been issued but not yet redeemed; and (iii) Purchased and delivered. These are media data files 200 for which a receipt token has been issued, validated, and redeemed by delivery of the file to requesting media player 116.

When a voucher packet is issued for a reservation, the voucher packet is added to the list of pending purchases.

In an alternative embodiment, an electronic wallet such as Wallet by CyberCash of Reston, Va. is used to provide the payment data. In this embodiment, merchant server 132 generates a Web page with a "Wallet" button and a "Retrieve It" button. When the user clicks the wallet button, merchant server 132 returns an invoice with a "wallet" MIME type, indicating the amount of the purchase. Web browser 128 launches a wallet application that is specific to the wallet MIME type. This wallet application recognizes the invoice information, and displays to the user a set of selections of different payment forms available to the user, such as electronic cash, check or specific credit card. The user selects one of these payment forms using conventional graphical user interface techniques. The wallet application connects to merchant server 132, e.g., using a network protocol defined by a manufacturer of the wallet application, and delivers the required payment information. The consumer clicks a 'Pay' button to consummate the transaction.

In either embodiment, merchant server 132 connects to payment processing system 134 to request payment in step 928 (FIG. 9B). In response thereto, payment processing system 134 (FIG. 1) verifies the availability of funds and sends payment authorization to merchant server 132 in step 930 (FIG. 9).

Once merchant server 132 (FIG. 1) has received payment authorization, merchant server 132 notifies content manager 112 that the user has purchased the media associated with the voucher ID. This is done by encrypting in step 932 (FIG. 9B) an authorization notification which includes the voucher ID and authorization token previously sent to merchant server 132 (FIG. 1) and a flag indicating the new state of the reservation as authorized for delivery and sending the encrypted authorization notification to content manager 112 in step 934 (FIG. 9B). In step 936, content manager 112 (FIG. 1) decrypts the authorization notification and, in step 938 (FIG. 9B), updates transaction database 130 (FIG. 1) to reflect that the voucher packet for this voucher ID has been authorized for purchase and download. This notification authorizes content manager 112 to enable the requested media data file 200 for delivery. In step 940 (FIG. 9B), content manager 112 (FIG. 1) encrypts a packet which includes the voucher ID and an updated authorization token, which identifies the recorded authorization and can be used to modify the recorded authorization, and, in step 942 (FIG. 9B), sends the packet. Merchant server 132 (FIG. 1) decrypts the packet in step 944 (FIG. 9B) to recover the voucher ID and updated authorization token.

After merchant server 132 (FIG. 1) has authorized a purchase, merchant server 132 logs this information to an internal purchase database. Purchase logging has two purposes. First, such logging enables the merchant to keep track sales of specific content. Second, such logging allows the merchant to accurately report to a rights agent 108 for copyright notification and billing purposes. In this illustrative embodiment, two logs are used: a merchant log and an audit log. The merchant log is plaintext, and the audit log is stored in an encrypted form. The audit log is uploaded periodically to media licensing center 110. The protocol for creating and validating the audit log is described under RIGHTS REPORTING below.

In the wallet payment embodiment described above, merchant server 132 returns a payment receipt to the wallet application.

In the non-wallet case, merchant server 132 creates and sends, in step 946 (FIG. 9C), a Web page—via the secure HTTP connection established originally—to Web browser 128 with a 'Retrieve It' link. Web browser 128 displays the Web page in step 948 (FIG. 9C). 'Retrieve It' link includes the URL of delivery server 118 (FIG. 1) as the delivery server to provide the requested media data file 200. An example of this data is:

https://web-server-addr/cgi-bin/
lavs?vid=VVV&receipt=RRR where VVV is the voucher ID and RRR is the receipt token.

When a user clicks on this link in the Web browser 128 in step 950 (FIG. 9C), another secure HTTP connection is setup by Web browser 128 (FIG. 1) with HTTP server 122, and the voucher ID and receipt token are passed to a CGI script of HTTP server 122 in step 952 (FIG. 9C). In step 954, the CGI script contacts content manager 112 (FIG. 1) to request the media voucher 300 (FIG. 3) containing the voucher ID, receipt token and delivery server network address and port number. The 'Retrieve it' URL can contain more than one voucher ID-receipt pair in order to retrieve multiple media data files 200 in a single operation. Content manager 112 (FIG. 1) generates the media voucher 300 (FIG. 3) and returns it to HTTP server 122 in step 956 (FIG. 9C). In step 958, HTTP server 112 (FIG. 1) forwards media voucher 300 to Web browser 128 via the secure HTTP connection. In addition, the media voucher request and transmission of steps 954 (FIG. 9C) and 956, respectively, are also performed through a secure HTTP connection or are otherwise passed between HTTP server 122 and content manager 112 in an encrypted format since such information passes through a publicly accessible network.

Media voucher 300 (FIG. 3) is returned with a M[ME type that identifies media voucher 300 as data for media player 116 (FIG. 1). Accordingly, Web browser 128 passes media voucher 300 to media player 116 in step 960 (FIG. 9C).

In step 962, media player 116 (FIG. 1) prompts the user to enter the passphrase associated with the private key registered to media player 116. Depending on a user-settable preference, the prompt will appear once per session or every time. Security is provided at this step by the passphrase protection of the user's private key 412 (FIG. 4) in their passport 400.

In step 964 (FIG. 9C), media player 116 (FIG. 1) uses the receipt token (the shared secret with the content manager 112) to authenticate voucher ID 302 (FIG. 3) and consumer certificate 402 (FIG. 4). Media player 116 (FIG. 1) establishes a TCP connection, which can be insecure, to delivery server 118 using the address and port specified in media voucher 300 (FIG. 3). Media player 116 (FIG. 1) creates a message containing a keyed MAC of voucher ID 302 (FIG. 3) using the receipt token as the key. This message is signed and sent in step 966 (FIG. 9C) to delivery server 118 (FIG. 1) to start the download procedure. In step 968 (FIG. 9C), delivery server 118 (FIG. 1) sends the encrypted data and the cleartext voucher ID 302 (FIG. 3) to content manager 112 (FIG. 1) for verification.

Content manager 112 maps voucher ID 302 (FIG. 3) to the receipt token in transaction database 130 (FIG. 1) and, in step 970 (FIG. 9C), uses the receipt token to verify the MAC encoded voucher ID and other data.

Figure 9D:
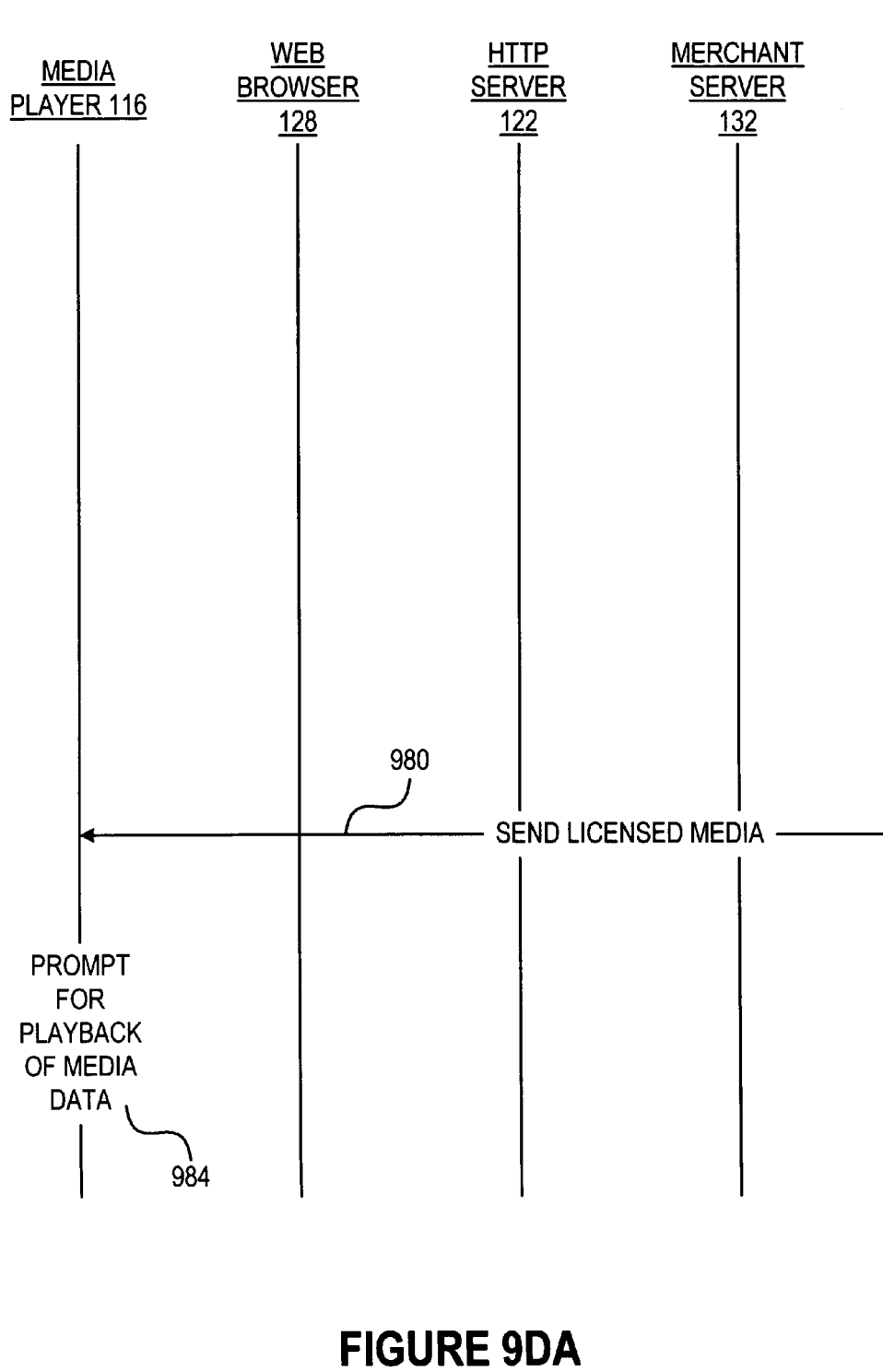
Figure 9D:
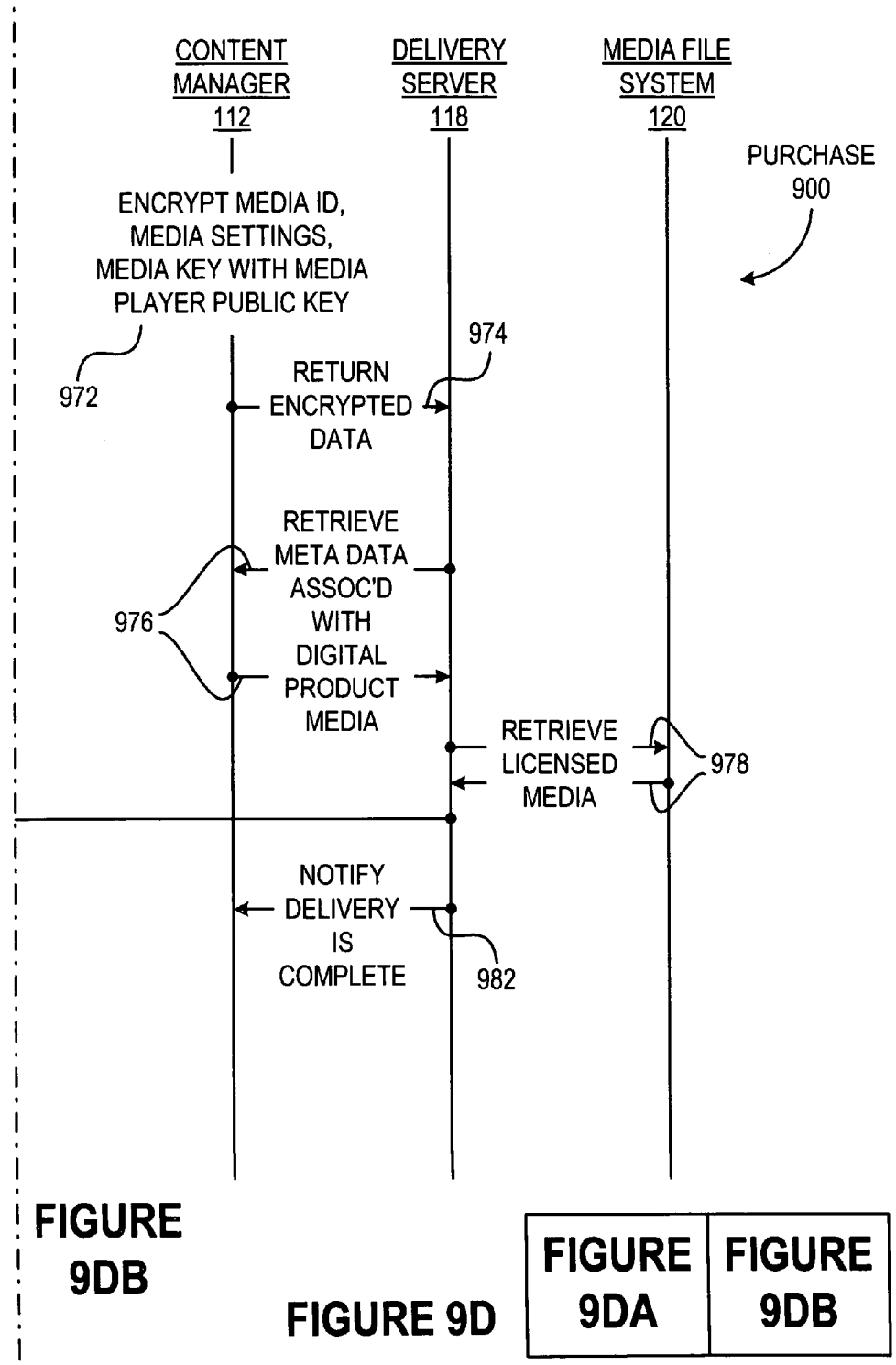

If the voucher ID is verified, content manager 112 (FIG. 1) encrypts the song's media key with the public key of media player 116 in step 972 (FIG. 9D). In this manner, the media becomes specifically and individually licensed to the consumer; media data file 200 (FIG. 2) is now referred to as the licensed media. Security in this step of the transaction is provided by the fact that media player 116 (FIG. 1) must prove that it has both the public/private key pair issued by media licensing center 110 and the receipt sent as part of the purchase transaction. The certificate chain is validated upon receipt from the player.

In step 974 (FIG. 9D), content manager 112 (FIG. 1) returns the encrypted media key, along with audio quality information (such as bit rate and number of channels), the public key algorithm used with the media key itself and encryption parameters, the delivery authorization token, media ID, the voucher ID, and the content manager's certificate serial number, and the media player's certificate number to delivery server 118.

In step 976 (FIG. 9D), delivery server 118 (FIG. 1) retrieves meta data associated with the licensed media from content manager 112. The media ID identifies the licensed media and the customer certificate received by delivery server 118 in step 966 (FIG. 9C) identifies the user of media player 116 (FIG. 1). Accordingly, content manager 112 selects meta data for the licensed media and for the user. Meta data associated with the licensed media, which is a musical audio signal in this illustrative example, can include for example lyrics, graphical images of album artwork, motion video, performer biographies, liner notes, credits, and critical commentary. Meta data associated with the user can include for example advertising artwork selected by content manager 112 according to the passport 400 certificate or information regarding the user stored by content manager 112. Such information can be as simple as residence information such that advertising artwork can be of regional interest. Alternatively, such information can be more specific and include such things as age, marital status, income, interests, etc. In such cases, advertising artwork can be selected by content manager 112 according to such demographic information of the user.

In step 978 (FIG. 9D), delivery server 118 (FIG. 1) retrieves the licensed media from master media data file system 120 according to the media ID included in media voucher 300 (FIG. 3). In step 980 (FIG. 9D), delivery server 118 (FIG. 1) sends the retrieved information—including the licensed media and the meta data—to media player 116 using a secure protocol, such as SSL, to ensure that no one else can determine which licensed media and meta data is being downloaded by media player 116. The downloaded media data is hashed by media player 116 and the hash is sent back to delivery server 118 to verify that the data received by media player 116 is complete and accurate. In a preferred embodiment, delivery service 118 limits the rate of the data transfer to media player 116 to conserve network resources.

Once delivery is complete and verified, delivery server 118 notifies content manager 112 in step 982 (FIG. 9D) of the competed delivery, indicating the voucher ID, media ID, receipt token, time duration of the download, and the authorization token. Content manager 112 (FIG. 1) updates transaction database 130 to reflect that the media data file has been delivered and records information describing the delivery in a log file. In step 984 (FIG. 9D), media player 116 (FIG. 1) can prompt the user to indicate that the received licensed media is ready for playback or automatically start playback of the licensed media.

When a received media data file 200 is to be played back (either immediately or at a later time), the consumer's passphrase is entered. Media player 116 extracts encrypted registration key 420 (FIG. 4) from passport 400 and decrypts it with the passphrase. Media player 116 (FIG. 1) extracts encrypted private key 412 (FIG. 4) from passport 400 and decrypts it with registration key 420. Media player 116 (FIG. 1) decrypts the media key with the consumer's private key 412. Finally, media player 116 decrypts audio image 208 (FIG. 2), using the media key, in real-time as the media is played.

As audio image 208 is being played back, the consumer's personal information 414 (FIG. 4) from passport 400, including their confidential information 418, is preferably displayed in the user interface of media player 116 (FIG. 1). The display of this information is a strong deterrent to the user to transfer an illegitimate copy of media data file 200 (FIG. 2) to another user since such requires display of confidential information 418 (FIG. 4) of the user. In addition, since media player 116 (FIG. 1) provided consumer certificate 402 (FIG. 4) as part of the delivery protocol, the certificate serial number is embedded in the media data file along with voucher ID 302 (FIG. 3). This enables either the merchant owning merchant server 132 (FIG. 1) which sold the music, or media licensing center 110 to lookup the consumer's personal information and identify this person as the source of an illegitimate copy of media data file 200 (FIG. 2).

Rights Reporting

Upon start up, content manager 112 (FIG. 1) communicates with media licensing center 110 to initiate a secure tamper-resistant log to be used for rights reporting information. Content manager 112 and media licensing center 110 negotiate a shared secret, a cryptographically strong random number that will be used to encrypt and validate the log. The secret is stored only within media licensing center 110 so the log created by content manager 112 can only be verified once the log is delivered to media licensing center 110.

A secure log entry is created for every media data file that is sold. Secure logging is known and is described, for example, in B. Schneier and J. Kelsey, "Cryptographic Support for Secure Logs on Untrusted Machines," *The Seventh USENIX Security Symposium Proceedings, USENIX Press*, pp. 53-62 (January 1998). When an entry is made, the secret is used as a key for encryption and for creating a keyed MAC and is then hashed with a text string to create the key used for the next log entry. The keyed MAC covers the encrypted log entry along with a "running hash" that is updated by hashing the current encrypted data into the old hash value. Since the encryption key and MAC key are different for each log entry and are created via a one-way hashing function, the only way to validate the log or decrypt an entry is to start with the shared secret which is stored only within media licensing center 110. This makes the log significantly secure against tampering once the log is created. Also, since the hash on each entry covers all previous entries, removal of entries in the middle of the log without detection when the log is validated at media licensing center 110 is highly unlikely.

This logging protocol is used for making entries each time a media data file is completely downloaded by media player 116. The log entry includes a timestamp, the track title, the artist name, the track authors, the song length, the sale price, the certificate ID from media player 116, the voucher ID, the media data file name and a descriptor identifying which audio image was downloaded. The logs are uploaded to media licensing center 110 on a periodic basis and validated off-line by a batch process. Once validated, the purchase information can be processed (e.g., totaled by artist, track, and the like) to determine proper royalty or other payments based on sales and previews.

Component Architecture

Content Manager

FIG. 10 shows software modules of a preferred embodiment of content manager 112. Content manager 112 includes a database access module 1002, a security module 1004, an administration module 1006, a rights reporting module 1008, a publishing module 1010, a commerce module 1012, a logging module 1014, and a certificate update module 1016.

Database access module 1002: This module manages all requests for data from master media file 120 and media information database 106. The various other modules interface with this module to retrieve, update, create, or delete media data file 200, media descriptive data 204. Database module 1002 receives data requests typically as name and value pair, and translates these requests to SQL requests on the underlying databases.

Publishing Module 1010: This module provides the interface for both external uploading from authoring tool 102 of media data files 200, and importing media data files 200 from the local file system of the computer hosting content manager 112.

More particularly, publishing module 1010 exports the following functions:

Upload File: This message is sent by authoring tool 102 to initiate the uploading of a media data file, e.g., media data file 200. The message includes the length of the media data file to be uploaded, flags indicating whether the file is to be created, overwriting any existing file, and whether the file is to be securely uploaded. The message also includes a file name of the file. If the file is to be securely uploaded, publishing module 1010 obtains from security module 1004 the public key of content manager 112 to encrypt the media key for the audio image, the certificate of content manager 112, and the algorithm used to encrypt the public key itself. This information is passed back (in step 508 of FIG. 5) to authoring tool 102 during the publishing process to authenticate content manager 112.

Upload Data: This message is sent by authoring tool 102 to content manager 112 and contains the data being uploaded (in step 522 of FIG. 5), as described in the previous message.

Upload Abort: This message ends an in-progress upload.

Upload Space: This message requests the amount of free space available within content manager 112 for new uploads. Publishing module 1010 responds with a total number of kilobytes allotted for uploading, and a number of free kilobytes remaining.

Import file: This message instructs publishing module 1010 to import a file from the local file system.

List Project: This message obtains a list of the file or subprojects in a local directory; the message data specifies the pathname of the directory. Publishing module 1010 responds with the number of entries for project, the filename of each entry and a flag for each entry indicating whether the entry represents a file or a subproject.

File Info: This message requests detailed information for a file, specified by pathname. Publishing module 1010 responds with the length of the file, flags indicating file type, and a URL to request streaming of the file.

Create Project: This message requests creation of a project, specified by pathname.

Rename File: This message renames a file from a specified source pathname to a specified destination pathname.

Delete File: This message deletes a file specified by pathname.

Security Module 1004: This module manages the various encryption processes provided by content manager 112. These include encryption of media keys, and digital signing of certificates and other data. Key generation is preferably provided by RSA BSAFE key generation routine. Digital signature is performed according to the known PKCS #1 MD5+RSA algorithm.

Commerce Module 1012: This module manages the transactions for previewing and purchasing media data files 200. This module interfaces with security module 1004 to obtain encryption services, and with database access module 1002 to obtain media information. Commerce module 1012 also determines which media data files 200 are available for sale.

Commerce module 1012 interfaces with merchant server 132 to receive requests for purchases and to provide reservations. Commerce module 1012 interfaces with merchant server 132 to provide and secure reservations for media data files.

Commerce module 1012 also delivers media vouchers 300 to media players 116, including the generation and validation of receipt tokens and authorization tokens.

Commerce module 1012 also maintains a list of reserved and available for retrieval media files, including tracking of pending purchases, purchased and not delivered files, and purchased and delivered files. Commerce module 1012 exports the following functions:

Preview: This message includes a media ID 304. In response to a preview message, commerce module 1012 sends a media voucher 300 which includes the address and port of delivery server 118 where the media may be streamed for preview and voucher ID 302 used for tracking the transaction.

Reserve: This message includes media ID 304, a quality indicator identifying the audio image 208 within the media data file to reserve, and the number of audio channels (e.g. "mono" or "stereo"). In response to a reserve message, commerce module 1012 sends back a voucher ID 302 for tracking the transaction, a timestamp for the start of the transaction, a timeout value representing the number of seconds for which the reservation is valid, an authorization string for modifying the reservation and a receipt string for the play to use in downloading the file.

Authorize: This message includes a voucher ID 302, an authorization string and a state value indicating that the reservation should be made available for download. In response to an authorize message, commerce module 1012 sends back a new authorization string for making further modifications to the reservation.

Expire: This message includes a voucher ID 302, and authorization string and a state value indicating that the reservation should be removed from the system.

Deliver: This message includes a voucher ID 302 and a receipt 306. In response to a deliver message, commerce module 1012 sends back a media voucher 300 which includes the address and port of a delivery server 118 where the media may be downloaded, a voucher ID 302 used for tracking the transaction and a receipt 306 used to validate media player 116 at time of delivery.

Administration Module 1006: This module defines the operation parameters of the system, including the number of delivery servers and the number of active streams allocated to each server, which ports are used by content manager 112 for network sending and receiving requests, and the number of songs available for purchase. This module also manages and tracks performance statistics, such as overall volume and throughput. Administration module 1006 exports the following functions:

Get Config: In response to a get configuration message, administration module 1006 sends the current configuration data in the form of a configuration file.

Set Config: This message includes a configuration file for content manager 112 and, in response to a set configuration message, administration module 1006 sets the configuration in accordance with the included configuration file.

CM Shutdown: This message shuts down content manager 112.

DS Shutdown: This message shuts down a delivery server specified by a network address included in the message.

Delete DS Configuration: This message shuts down a delivery server specified by a network address included in the message, e.g., delivery server 118, and removes the delivery server from the configuration of content manager 112.

CM Statistics: This message requests system statistics. Administration module 1006 responds with:

Uptime: the amount of time content manager 112 has been running.

Vouchers: the number of media vouchers 300 issued by content manager 112.

CacheSize: a maximum number of media data files 200 that can be cached.

Items: the current number of media data files 200 in the cache.

Access: the total number of accesses to media data files 200.

Misses: the number of accesses to media data files 200 that were not in the cache. #Items, #Access, and #Misses allow the system provider to determine whether an increase in the cache size is appropriate.

In-cache: the number of access to media data files 200 currently in the cache.

DS: the number of delivery servers connected to content manager 112.

DS Address n: the network address of the nth delivery server 118.

Streams n: the number of streams allocated to the nth delivery server 118.

Used n: the number of streams used by the nth delivery server 118.

Logging Module 1014: This module provides for error logging of errors during communications between content manager 112 and other system components; purchase logging to log each purchase of a media data file 200; and preview logging to log each preview of a media data file. These logs are used by right reporting module 1008 to generate and report sales, usages, and chargebacks of media data files 200.

Rights Reporting Module 1008: This module communicates with rights agents 108 to report usage rates and totals for the various media data files 200 within the system. Rights reporting includes the identity of each media data file purchased or downloaded, the type of use, and any agency information or codes specifically designated for the media data file 200.

Certificate Update Module 1016: This module interfaces with media licensing center 110 to receive updates of the certificate of content manager 112. The certificate of content manager 112 is issued with short validity periods, preferably about 1 to 2 weeks. This requires content manager 112 to be re-certified on a regular basis, ensuring that content manager 112 remains authenticated over time.

Delivery Server

FIG. 11 shows the software architecture of one embodiment of delivery server 118. Delivery server 118 includes a request processor 1102, a preview module 1104, purchase module 1106, and a content manager communications module 1108.

Request Processor 1102: This module handles requests from media player 116 to preview or purchase media data files. A request is sent to either preview module 1104 or purchase module 1106, depending on the type of request, as encoded in the URL passed to HTTP server 122. This module provides a DS Register function, registers the network address of delivery server 118 with content manager 112.

Content Manager Communications Module 1108: This module establishes a TCP connection to content manager 112 to obtain configuration information, validate voucher IDs, obtain current media information, obtain purchase validation information and digital signing information.

Preview Module 1104: This module responds to requests for streaming media data for real time playback of audio by media player 116. This module provides the following functions:

Allocate Stream: this message is sent by preview module 1104 to content manager 112 to indicate that a stream has been allocated for a particular preview request. The message specifies the voucher ID for the request, the network address of media player 116 as the media player to receive the stream, the bandwidth requested by media player 116, and the media ID for the file to be streamed.

Release Stream: this message is sent by preview module 1104 to content manager 112 to release a stream following completion of a request. The message includes the voucher ID, error status, duration of the stream, and identity of the audio image that was streamed.

Preview module 1104 also implements a streaming protocol to stream the media data, based on RFC-1889, and RFC-1890, Real Time Transfer Protocol. The streaming protocol includes:

Initiate: this message is sent by media player 116 to initiate a connection to delivery server 118; the message includes the network address of delivery server 118 (from media voucher 300), the port of the media player to receive the stream, bandwidth, voucher ID, and media ID.

Stream Ready: this message is sent by delivery server 118 to media player 116 to provide clip and song parameters for previewing a file, including lead-in and lead-out, fade-in and fadeout, bandwidth, and duration.

Actual streaming is managed by a transport control protocol. Transport messages describe specific times in audio image 208 to be accessed to begin streaming playback. Since delivery server 118 can only seek to well-defined places in audio image 208 (as defined in the index table), media player 116 must first determine a nearest time to begin streaming. Accordingly, preview module 1104 supports a Query Time function, which requests a desired starting time. Preview module 1104 responds to a Query Time function with a Nearest Time message indicating the time nearest to the desired starting time, and a number of bytes to be sent from the specified time to the end of a clip. A Transport function, taking a specified time (the nearest time response), instructs preview module 1104 to begin streaming at the specified time.

Purchase Module 1106: This module manages a secure channel of communication based on a shared "secret" which is the receipt token that security module 1004 generates as part of media voucher 300. This module exports the following functions:

Redeem Initiate: This message is sent by media player 116 to initialize a connection for the downloading a media data file 200.

Redeem Approved: This message is sent by purchase module 1106 to media player 116 if the purchase request is approved by validation of the encrypted validation information.

Redeem Start: This message is sent by media player 116 to initiate the download itself Get Info: This message is sent by purchase module 1106 to content manager 112 to request the media descriptive data.

Redeem Data Transfer Done: This message is sent by purchase module 1106 when all the data has been transferred.

Media Licensing Center

Media licensing center 110 is responsible for the generation of certificates to the other system components, and the generation of key pairs for media player 116. FIG. 12 illustrates one embodiment of the software architecture of media licensing center 110 which includes the following modules:

Key Generation Module 1202: This module provides public/private key pairs for media player 116 and possibly for content managers as well.

Request Handler Module 1204: This module deals with all external communication to media licensing center 110. This can be accomplished through a Web page form for a user requesting a passport or a certificate of content manager 112 to be routed to authentication module 1206 or for requesting recovery for a lost passport or a forgotten passphrase.

Authentication Module 1206: This module authenticates a user identity with some external system to verify address, and to separately validate credit card through a payment processing system 134 for requesting a passport. For content manager certificates, authentication module 1206 verifies that there is an account setup for the particular music distribution center 124 making the request.

Certificate Generation Module 1208: This module provides the certificates for all other system components; in this fashion media licensing center 110 acts as a certificate authority. The certificates are preferably ITU-T X.509 compliant, and include the public key of the requesting entity (whether generated by that entity or by key generation module 1202), information identifying the requesting entity, validity information, and a digital signature of media licensing center 110. The digital signature is preferably generated according to RSA Laboratories' PKCS #1 specification. In particular, this module produces consumer certificate 402 during registration in accordance with event trace 600.

Passport Generation Module 1210: This module receives a consumer certificate 402 from certificate generation module 1208, the consumer's private key from key generation module 1202, and user personal information from the registration form through Web browser 128, generates registration key 420, and packages all of this data as a registration file to be delivered to media player 116.

Certificate Database Module 1212: This module is a data repository for persistently storing pertinent consumer identifying information and the registration key to enable recovery of passports 400. It also stores account information for music distribution centers.

Administration Module 1214: This module generates reports various information regarding passports and certificates, including the number of passports 400 and certificates issued, currently valid certificates, and expired certificates.

Certificate Update Module 1216: The certificate issued by certificate generation module 1208 will have varying validity periods. The validity period for consumer certificates is 1 year. The validity period for certificates of content manager 112 and delivery server 118 is about 2 to 4 weeks. Certificate update module 1216 periodically reviews passport database 1212 to determine which certificates have expired. Certificate update module 1216 authenticates the entities holding expired certificates and issues new certificates.

Media Player

FIG. 13 illustrates the software architecture of media player 116. Media player 116 provides for decryption and playback of media data files, and for recording an audio data file from a media data file onto a recordable Compact Disc (CD) for later playback on conventional CD players and for recording on solid-state memory devices. Media player 116 interfaces with delivery server 118 to receive media data files and includes the following modules:

User Interface Module 1314: This module provides a user interface for controlling the playback of audio data including controls for playing, fast forwarding, reversing, pausing playback, and along with displays and controls for viewing time, time remaining, artist and track information, cover and promotional illustration art, and lyrics. These controls operate with respect to both streaming of audio data from a delivery server 118 during a preview transaction, and playback of locally stored audio data, including audio recorded by the user onto compact disk. The various controls respond to signals generated by the user through physical manipulation of user input devices of client system 126 in a conventional manner and invoke functions which generate the transport protocol and download protocol messages to delivery server 118.

Network Communication Module 1300: This module manages the interface of media player 116 with the network, including establishing TCP connections over either secure or insecure channels with a delivery server 118 or its proxy. Network communication module 1300 provides functions establishing the connection, requesting media to preview or purchase, playback controls such as stop, start at time offset, and the like, and connection shutdown.

Passport Management Module 1302: This module is responsible for managing the user's passport. This module operates during registration of media player 116, and during playback of audio data. During registration, Web browser 128 receives a registration file via an SSL connection from passport generation module 1210 of media licensing center 110. The registration file contains the data to be used in a user's passport, and is stored locally in the client computer 124. The registration file is not encrypted in this illustrative embodiment. Web browser 128 invokes media player 116 providing the file name and path of this registration file. Passport management module 1302 retrieves from this registration file the passport data and encrypts the passport data with a user-specified passphrase in accordance with the RSA PKCS #5 algorithm, for example. During playback, passport management module 1302 is used to first decrypt the passport using the passphrase, and to decrypt the media key stored therein using the user's private key. The media key is then used by playback module 1316 to decrypt the encrypted audio data in a purchased media data file. In addition, passport management module 1302 decrypts personal information 414 from passport 400, including the user's name and confidential information, such as the credit card number, providing the name and confidential information to user interface module 1314 for display during playback.

Purchase Module 1304: This module manages the purchase of media data files. This module interfaces with Web browser 128 to receive therefrom a media voucher 300 identifying the media to be purchased and the delivery server, e.g., delivery server 118, to fulfill delivery. This module then communicates with delivery server 118 to securely download the media data file, including generation of download messages according to delivery server 118 download protocols. Purchase module 1304 also interfaces with passport management module 1302 to obtain consumer certificate 402 from passport 400. The consumer certificate is provided to delivery server 118, which passes the consumer certificate to content manager 112 to encrypt the media key with the consumer's public key contained therein.

Preview Module 1306: This module manages the request and acquisition and real time streaming of media from delivery server 118. Preview module 1306 interfaces with delivery server 118 via the transport controls to stream media for previewing and free download.

File Management Module 1308: This module reads media data files 200 from, and writes media data files 200 to, the local hard disk of client computer system 124.

CD Device Management Module 1310: This module formats a media data file 200 for writing on CD-Recordable, or other writeable device. Formatting includes decompression and formatting to CD Red Book standards. Preferably, the decompressed data is maintained in an encrypted format until immediately prior to writing the data to the device.

Track List Module 1312: This module organizes the user's media data files into various lists of media tracks, and provides a user interface to access and manage this information. This enables the user to create lists of media to be recorded to a CD or similar portable storage medium.

Playback Module 1316: This module performs playback of a media data file 200, including decryption of audio image 208 using the media key. Playback module 1316 implements controls to start, stop, pause, reverse, and fast forward playback.

The above description is illustrative only and is not limiting. Instead, the present invention is limited only by the claims that follow.

What is claimed is:

1. A method for conducting electronic commerce through a computer network, the method comprising:

receiving, in a merchant computer system of the computer network from a buyer computer system, a purchase request for a digital product;

receiving from the buyer computer system a designation of a client computer system to which to deliver the digital product;

receiving payment data in the merchant computer system wherein the payment data specifies remuneration for the digital product;

sending a request for reservation of the digital product to a content manager computer system which is coupled to the merchant computer system through the computer network;

in response to receiving the request for reservation and after receiving the payment data from the buyer computer system, forming by the content manager computer system transaction data which include (i) transaction identification data, (ii) product identification data which identifies the digital product, and (iii) binding data which binds the transaction to the designated client computer system;

sending the formed transaction data from the content manager computer system to the merchant computer system;

receiving, in the content manager computer system, a delivery request signal from the merchant computer system wherein the delivery request signal requests delivery of the digital product through the computer network to the designated client computer system;

sending the formed transaction data to the designated client computer system wherein the formed transaction data identifies the digital product and represents remuneration in accordance with the payment data; and receiving, in a delivery computer system of the computer network, the formed transaction data from the designated client computer system;

determining within the delivery computer system, in accordance with the formed transaction data, the digital product; and sending, from the delivery computer system, the digital product to the designated client computer system; and sending, from the delivery computer system to the content manager computer system, a signal indicating that sending the digital product to the designated client computer system is completed.

2. The method of claim 1 wherein sending the digital product from the delivery computer system to the designated client computer system comprises:

creating a new encrypting key which is intended to be used only once;

encrypting the digital product with the new encryption key to form an encrypted digital product;

sending the encrypted digital product to the designated client computer system;

decrypting the encrypted digital product within the designated client computer system to recover the digital product; and discarding the new encryption key.

3. The method of claim 1 wherein requesting reservation by the merchant computer system comprises:

encrypting data representing a requested reservation;

sending the data as encrypted to the content manager computer system; and decrypting the data within the content manager computer system.

4. The method of claim 1 wherein the delivery request signal includes the formed transaction data.

5. A computer readable medium having computer-executable instructions for performing steps comprising:

receiving, in a merchant computer system of the computer network from a buyer computer system, a purchase request for a digital product;

receiving from the buyer computer system a designation of a client computer system to which to deliver the digital product;

receiving payment data in the merchant computer system wherein the payment data specifies remuneration for the digital product;

sending a request for reservation of the digital product to a content manager computer system which is coupled to the merchant computer system through the computer network;

in response to receiving the request for reservation and after receiving the payment data from the buyer computer system, forming by the content manager computer system transaction data which include (i) transaction identification data, (ii) product identification data which identifies the digital product, and (iii) binding data which binds the transaction to the designated client computer system;

sending the formed transaction data from the content manager computer system to the merchant computer system;

receiving, in the content manager computer system, a delivery request signal from the merchant computer system wherein the delivery request signal requests delivery of the digital product through the computer network to the designated client computer system;

sending the formed transaction data to the designated client computer system wherein the formed transaction data identifies the digital product and represents remuneration in accordance with the payment data; and receiving, in a delivery computer system of the computer network, the formed transaction data from the designated client computer system;

determining within the delivery computer system, in accordance with the formed transaction data, the digital product; and sending, from the delivery computer system, the digital product to the designated client computer system; and sending, from the delivery computer system to the content manager computer system, a signal indicating that sending the digital product to the designated client computer system is completed.

6. The computer readable medium of claim 5 wherein sending the digital product from the delivery computer system to the designated client computer system comprises:

creating a new encrypting key which is intended to be used only once;

encrypting the digital product with the new encryption key to form an encrypted digital product;

sending the encrypted digital product to the designated client computer system;

decrypting the encrypted digital product within the designated client computer system to recover the digital product; and discarding the new encryption key.

7. The computer readable medium of claim 5 wherein requesting reservation by the merchant computer system comprises:

encrypting data representing a requested reservation;

sending the data as encrypted to the content manager computer system; and decrypting the data within the content manager computer system.

8. The computer readable medium of claim 5 wherein the delivery request signal includes the formed transaction data.

* * * * *